US006108122A

United States Patent [19]

Ulrich et al.

[11] Patent Number: 6,108,122

[45] Date of Patent: Aug. 22, 2000

[54] LIGHT MODULATING DEVICES

[75] Inventors: Diana Cynthia Ulrich; Michael John Towler, both of Oxford, United Kingdom

[73] Assignees: Sharp Kabushiki Kaisha, Osaka, Japan; The Secretary of State for Defense in Her Brittanic Majesty's Government of the United Kingdom of Great Britain and Northern Ireland, Hants, United Kingdom

[21] Appl. No.: 09/300,303

[22] Filed: Apr. 27, 1999

[30] Foreign Application Priority Data

Apr. 29, 1998 [GB] United Kingdom .................. 9809013

[51] Int. Cl.[7] ............................ G02B 26/00; G09G 5/10

[52] U.S. Cl. ......................... 359/291; 359/252; 345/147; 345/150; 345/204

[58] Field of Search .................................... 359/290, 291, 359/295, 252; 345/147, 148, 150, 204, 509

[56] References Cited

U.S. PATENT DOCUMENTS

| | | | |
|---|---|---|---|
| 5,389,944 | 2/1995 | Liu | 345/147 |
| 5,818,419 | 10/1998 | Tajima et al. | 345/147 |
| 5,986,640 | 11/1999 | Baldwin et al. | 345/147 |
| 5,986,647 | 11/1999 | Feldman | 345/204 |
| 6,008,794 | 12/1999 | Ishii | 345/150 |

FOREIGN PATENT DOCUMENTS

| | | |
|---|---|---|
| 0526045 | 2/1993 | European Pat. Off. . |
| 2318248 | 4/1998 | United Kingdom . |
| 2320357 | 6/1998 | United Kingdom . |

OTHER PUBLICATIONS

P.W.H. Surguy et al., Ferroelectrics, 1991, vol. 122, pp. 63–79, "The 'Joers/Alvey Ferroelectric Multiplexing Scheme".

Zhu Yi–Wen et al., Technical Report of IEICE EID 96–60 (1996–11), pp. 67–72, "A Motion–Dependent Equalising––Pulse Technique For Reducing Dynamic False Contours On PDPs".

*Primary Examiner*—Loha Ben
*Attorney, Agent, or Firm*—Renner, Otto Boisselle & Sklar

[57] ABSTRACT

A ferroelectric liquid crystal display panel comprises an addressable matrix of pixels and an arrangement for selectively addressing each pixel within a series of addressing frames in order to vary the transmission level of the pixel relative to the transmission levels of the other pixels. The addressing arrangement utilizes a temporal dither (TD) addressing scheme for addressing each pixel within each frame with different combinations of temporal dither signals applied to separately addressable temporal bits within the frame to produce different overall transmission levels. In order to limit the perceived errors at the transitions between different grey levels the TD addressing scheme is arranged to address a first pixel with a first combination of TD signals to produce a first grey level and to address a second pixel with a second combination of TD signals, which differs from the first combination of TD signals, to produce the same first grey level such that, during a transition between the first grey level and a second grey level, a transient in one direction in the transmission level of the first pixel is at least partially compensated for by a transient in the opposite direction in the transmission level of the second pixel.

84 Claims, 24 Drawing Sheets

FIG. 19a lookup1

| GL | SD1 TD8 | SD2 TD8 | SD1 TD4 | SD2 TD4 | SD1 TD1 | SD2 TD1 | SD1 TD8 | SD2 TD8 |
|---|---|---|---|---|---|---|---|---|
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 0 | 1 | 0 | 0 |
| 3 | 0 | 0 | 0 | 0 | 1 | 1 | 0 | 0 |
| 4 | 0 | 0 | 1 | 0 | 0 | 0 | 0 | 0 |
| 5 | 0 | 0 | 1 | 0 | 1 | 0 | 0 | 0 |
| 6 | 0 | 0 | 1 | 0 | 0 | 1 | 0 | 0 |
| 7 | 0 | 0 | 1 | 0 | 1 | 1 | 0 | 0 |
| 8 | 1 | 0 | 0 | 0 | 0 | 0 | 0 | 0 |
| 9 | 1 | 0 | 0 | 0 | 1 | 0 | 0 | 0 |
| 10 | 1 | 0 | 0 | 0 | 0 | 1 | 0 | 0 |
| 11 | 1 | 0 | 0 | 0 | 1 | 1 | 0 | 0 |
| 12 | 1 | 0 | 1 | 0 | 0 | 0 | 0 | 0 |
| 13 | 1 | 0 | 1 | 0 | 1 | 0 | 0 | 0 |
| 14 | 1 | 0 | 1 | 0 | 0 | 1 | 0 | 0 |
| 15 | 1 | 0 | 1 | 0 | 1 | 1 | 0 | 0 |
| 16 | 0 | 1 | 0 | 0 | 0 | 0 | 0 | 0 |
| 17 | 0 | 1 | 0 | 0 | 1 | 0 | 0 | 0 |
| 18 | 0 | 1 | 0 | 0 | 0 | 1 | 0 | 0 |
| 19 | 0 | 1 | 0 | 0 | 1 | 1 | 0 | 0 |
| 20 | 0 | 1 | 1 | 0 | 0 | 0 | 0 | 0 |
| 21 | 0 | 1 | 1 | 0 | 1 | 0 | 0 | 0 |
| 22 | 0 | 1 | 1 | 0 | 0 | 1 | 0 | 0 |
| 23 | 0 | 1 | 1 | 0 | 1 | 1 | 0 | 0 |
| 24 | 1 | 1 | 0 | 0 | 0 | 0 | 0 | 0 |
| 25 | 1 | 1 | 0 | 0 | 1 | 0 | 0 | 0 |
| 26 | 1 | 1 | 0 | 0 | 0 | 1 | 0 | 0 |
| 27 | 1 | 1 | 0 | 0 | 1 | 1 | 0 | 0 |
| 28 | 1 | 1 | 1 | 0 | 0 | 0 | 0 | 0 |
| 29 | 1 | 1 | 1 | 0 | 1 | 0 | 0 | 0 |
| 30 | 1 | 1 | 1 | 0 | 0 | 1 | 0 | 0 |
| 31 | 1 | 1 | 1 | 0 | 1 | 1 | 0 | 0 |
| 32 | 1 | 1 | 0 | 1 | 0 | 0 | 0 | 0 |
| 33 | 1 | 1 | 0 | 1 | 1 | 0 | 0 | 0 |
| 34 | 1 | 1 | 0 | 1 | 0 | 1 | 0 | 0 |
| 35 | 1 | 1 | 0 | 1 | 1 | 1 | 0 | 0 |
| 36 | 1 | 1 | 1 | 1 | 0 | 0 | 0 | 0 |
| 37 | 1 | 1 | 1 | 1 | 1 | 0 | 0 | 0 |
| 38 | 1 | 1 | 1 | 1 | 0 | 1 | 0 | 0 |
| 39 | 1 | 1 | 1 | 1 | 1 | 1 | 0 | 0 |
| 40 | 1 | 1 | 0 | 1 | 0 | 0 | 1 | 0 |
| 41 | 1 | 1 | 0 | 1 | 1 | 0 | 1 | 0 |
| 42 | 1 | 1 | 0 | 1 | 0 | 1 | 1 | 0 |
| 43 | 1 | 1 | 0 | 1 | 1 | 1 | 1 | 0 |
| 44 | 1 | 1 | 1 | 1 | 0 | 0 | 1 | 0 |
| 45 | 1 | 1 | 1 | 1 | 1 | 0 | 1 | 0 |
| 46 | 1 | 1 | 1 | 1 | 0 | 1 | 1 | 0 |
| 47 | 1 | 1 | 1 | 1 | 1 | 1 | 1 | 0 |
| 48 | 1 | 1 | 0 | 1 | 0 | 0 | 0 | 1 |
| 49 | 1 | 1 | 0 | 1 | 1 | 0 | 0 | 1 |
| 50 | 1 | 1 | 0 | 1 | 0 | 1 | 0 | 1 |
| 51 | 1 | 1 | 0 | 1 | 1 | 1 | 0 | 1 |
| 52 | 1 | 1 | 1 | 1 | 0 | 0 | 0 | 1 |
| 53 | 1 | 1 | 1 | 1 | 1 | 0 | 0 | 1 |
| 54 | 1 | 1 | 1 | 1 | 0 | 1 | 0 | 1 |
| 55 | 1 | 1 | 1 | 1 | 1 | 1 | 0 | 1 |
| 56 | 1 | 1 | 0 | 1 | 0 | 0 | 1 | 1 |
| 57 | 1 | 1 | 0 | 1 | 1 | 0 | 1 | 1 |
| 58 | 1 | 1 | 0 | 1 | 0 | 1 | 1 | 1 |
| 59 | 1 | 1 | 0 | 1 | 1 | 1 | 1 | 1 |
| 60 | 1 | 1 | 1 | 1 | 0 | 0 | 1 | 1 |
| 61 | 1 | 1 | 1 | 1 | 1 | 0 | 1 | 1 |
| 62 | 1 | 1 | 1 | 1 | 0 | 1 | 1 | 1 |
| 63 | 1 | 1 | 1 | 1 | 1 | 1 | 1 | 1 |

FIG. 19b lookup2

| GL | SD1 TD8 | SD2 TD8 | SD1 TD4 | SD2 TD4 | SD1 TD1 | SD2 TD1 | SD1 TD8 | SD2 TD8 |
|---|---|---|---|---|---|---|---|---|
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 0 | 1 | 0 | 0 |
| 3 | 0 | 0 | 0 | 0 | 1 | 1 | 0 | 0 |
| 4 | 0 | 0 | 1 | 0 | 0 | 0 | 0 | 0 |
| 5 | 0 | 0 | 1 | 0 | 1 | 0 | 0 | 0 |
| 6 | 0 | 0 | 1 | 0 | 0 | 1 | 0 | 0 |
| 7 | 0 | 0 | 1 | 0 | 1 | 1 | 0 | 0 |
| 8 | 0 | 0 | 0 | 0 | 0 | 0 | 1 | 0 |
| 9 | 0 | 0 | 0 | 0 | 1 | 0 | 1 | 0 |
| 10 | 0 | 0 | 0 | 0 | 0 | 1 | 1 | 0 |
| 11 | 0 | 0 | 0 | 0 | 1 | 1 | 1 | 0 |
| 12 | 0 | 0 | 1 | 0 | 0 | 0 | 1 | 0 |
| 13 | 0 | 0 | 1 | 0 | 1 | 0 | 1 | 0 |
| 14 | 0 | 0 | 1 | 0 | 0 | 1 | 1 | 0 |
| 15 | 0 | 0 | 1 | 0 | 1 | 1 | 1 | 0 |
| 16 | 0 | 0 | 0 | 0 | 0 | 0 | 0 | 1 |
| 17 | 0 | 0 | 0 | 0 | 1 | 0 | 0 | 1 |
| 18 | 0 | 0 | 0 | 0 | 0 | 1 | 0 | 1 |
| 19 | 0 | 0 | 0 | 0 | 1 | 1 | 0 | 1 |
| 20 | 0 | 0 | 1 | 0 | 0 | 0 | 0 | 1 |
| 21 | 0 | 0 | 1 | 0 | 1 | 0 | 0 | 1 |
| 22 | 0 | 0 | 1 | 0 | 0 | 1 | 0 | 1 |
| 23 | 0 | 0 | 1 | 0 | 1 | 1 | 0 | 1 |
| 24 | 0 | 0 | 0 | 0 | 0 | 0 | 1 | 1 |
| 25 | 0 | 0 | 0 | 0 | 1 | 0 | 1 | 1 |
| 26 | 0 | 0 | 0 | 0 | 0 | 1 | 1 | 1 |
| 27 | 0 | 0 | 0 | 0 | 1 | 1 | 1 | 1 |
| 28 | 0 | 0 | 1 | 0 | 0 | 0 | 1 | 1 |
| 29 | 0 | 0 | 1 | 0 | 1 | 0 | 1 | 1 |
| 30 | 0 | 0 | 1 | 0 | 0 | 1 | 1 | 1 |
| 31 | 0 | 0 | 1 | 0 | 1 | 1 | 1 | 1 |
| 32 | 0 | 0 | 0 | 1 | 0 | 0 | 1 | 1 |
| 33 | 0 | 0 | 0 | 1 | 1 | 0 | 1 | 1 |
| 34 | 0 | 0 | 0 | 1 | 0 | 1 | 1 | 1 |
| 35 | 0 | 0 | 0 | 1 | 1 | 1 | 1 | 1 |
| 36 | 0 | 0 | 1 | 1 | 0 | 0 | 1 | 1 |
| 37 | 0 | 0 | 1 | 1 | 1 | 0 | 1 | 1 |
| 38 | 0 | 0 | 1 | 1 | 0 | 1 | 1 | 1 |
| 39 | 0 | 0 | 1 | 1 | 1 | 1 | 1 | 1 |
| 40 | 1 | 0 | 0 | 1 | 0 | 0 | 1 | 1 |
| 41 | 1 | 0 | 0 | 1 | 1 | 0 | 1 | 1 |
| 42 | 1 | 0 | 0 | 1 | 0 | 1 | 1 | 1 |
| 43 | 1 | 0 | 0 | 1 | 1 | 1 | 1 | 1 |
| 44 | 1 | 0 | 1 | 1 | 0 | 0 | 1 | 1 |
| 45 | 1 | 0 | 1 | 1 | 1 | 0 | 1 | 1 |
| 46 | 1 | 0 | 1 | 1 | 0 | 1 | 1 | 1 |
| 47 | 1 | 0 | 1 | 1 | 1 | 1 | 1 | 1 |
| 48 | 0 | 1 | 0 | 1 | 0 | 0 | 1 | 1 |
| 49 | 0 | 1 | 0 | 1 | 1 | 0 | 1 | 1 |
| 50 | 0 | 1 | 0 | 1 | 0 | 1 | 1 | 1 |
| 51 | 0 | 1 | 0 | 1 | 1 | 1 | 1 | 1 |
| 52 | 0 | 1 | 1 | 1 | 0 | 0 | 1 | 1 |
| 53 | 0 | 1 | 1 | 1 | 1 | 0 | 1 | 1 |
| 54 | 0 | 1 | 1 | 1 | 0 | 1 | 1 | 1 |
| 55 | 0 | 1 | 1 | 1 | 1 | 1 | 1 | 1 |
| 56 | 1 | 1 | 0 | 1 | 0 | 0 | 1 | 1 |
| 57 | 1 | 1 | 0 | 1 | 1 | 0 | 1 | 1 |
| 58 | 1 | 1 | 0 | 1 | 0 | 1 | 1 | 1 |
| 59 | 1 | 1 | 0 | 1 | 1 | 1 | 1 | 1 |
| 60 | 1 | 1 | 1 | 1 | 0 | 0 | 1 | 1 |
| 61 | 1 | 1 | 1 | 1 | 1 | 0 | 1 | 1 |
| 62 | 1 | 1 | 1 | 1 | 0 | 1 | 1 | 1 |
| 63 | 1 | 1 | 1 | 1 | 1 | 1 | 1 | 1 |

FIG. 25a lookup1

| | SD1 TD32 | SD2 TD32 | SD1 TD16 | SD2 TD16 | SD1 TD4 | SD2 TD4 | SD1 TD1 | SD2 TD1 | SD1 TD32 | SD2 TD32 |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 1 | 0 | 0 | 0 |
| 2 | 0 | 0 | 0 | 0 | 0 | 0 | 0 | 1 | 0 | 0 |
| 3 | 0 | 0 | 0 | 0 | 0 | 0 | 1 | 1 | 0 | 0 |
| 4 | 0 | 0 | 0 | 0 | 1 | 0 | 0 | 0 | 0 | 0 |
| 5 | 0 | 0 | 0 | 0 | 1 | 0 | 1 | 0 | 0 | 0 |
| 6 | 0 | 0 | 0 | 0 | 1 | 0 | 0 | 1 | 0 | 0 |
| 7 | 0 | 0 | 0 | 0 | 1 | 0 | 1 | 1 | 0 | 0 |
| 8 | 0 | 0 | 0 | 0 | 0 | 1 | 0 | 0 | 0 | 0 |
| 9 | 0 | 0 | 0 | 0 | 0 | 1 | 1 | 0 | 0 | 0 |
| 10 | 0 | 0 | 0 | 0 | 0 | 1 | 0 | 1 | 0 | 0 |
| 11 | 0 | 0 | 0 | 0 | 0 | 1 | 1 | 1 | 0 | 0 |
| 12 | 0 | 0 | 0 | 0 | 1 | 1 | 0 | 0 | 0 | 0 |
| 13 | 0 | 0 | 0 | 0 | 1 | 1 | 1 | 0 | 0 | 0 |
| 14 | 0 | 0 | 0 | 0 | 1 | 1 | 0 | 1 | 0 | 0 |
| 15 | 0 | 0 | 0 | 0 | 1 | 1 | 1 | 1 | 0 | 0 |
| 16 | 0 | 0 | 1 | 0 | 0 | 0 | 0 | 0 | 0 | 0 |
| 17 | 0 | 0 | 1 | 0 | 0 | 0 | 1 | 0 | 0 | 0 |
| 18 | 0 | 0 | 1 | 0 | 0 | 0 | 0 | 1 | 0 | 0 |
| 19 | 0 | 0 | 1 | 0 | 0 | 0 | 1 | 1 | 0 | 0 |
| 20 | 0 | 0 | 1 | 0 | 1 | 0 | 0 | 0 | 0 | 0 |
| 21 | 0 | 0 | 1 | 0 | 1 | 0 | 1 | 0 | 0 | 0 |
| 22 | 0 | 0 | 1 | 0 | 1 | 0 | 0 | 1 | 0 | 0 |
| 23 | 0 | 0 | 1 | 0 | 1 | 0 | 1 | 1 | 0 | 0 |
| 24 | 0 | 0 | 1 | 0 | 0 | 1 | 0 | 0 | 0 | 0 |
| 25 | 0 | 0 | 1 | 0 | 0 | 1 | 1 | 0 | 0 | 0 |
| 26 | 0 | 0 | 1 | 0 | 0 | 1 | 0 | 1 | 0 | 0 |
| 27 | 0 | 0 | 1 | 0 | 0 | 1 | 1 | 1 | 0 | 0 |
| 28 | 0 | 0 | 1 | 0 | 1 | 1 | 0 | 0 | 0 | 0 |
| 29 | 0 | 0 | 1 | 0 | 1 | 1 | 1 | 0 | 0 | 0 |
| 30 | 0 | 0 | 1 | 0 | 1 | 1 | 0 | 1 | 0 | 0 |
| 31 | 0 | 0 | 1 | 0 | 1 | 1 | 1 | 1 | 0 | 0 |
| 32 | 1 | 0 | 0 | 0 | 0 | 0 | 0 | 0 | 0 | 0 |
| 33 | 1 | 0 | 0 | 0 | 0 | 0 | 1 | 0 | 0 | 0 |
| 34 | 1 | 0 | 0 | 0 | 0 | 0 | 0 | 1 | 0 | 0 |
| 35 | 1 | 0 | 0 | 0 | 0 | 0 | 1 | 1 | 0 | 0 |
| 36 | 1 | 0 | 0 | 0 | 1 | 0 | 0 | 0 | 0 | 0 |
| 37 | 1 | 0 | 0 | 0 | 1 | 0 | 1 | 0 | 0 | 0 |
| 38 | 1 | 0 | 0 | 0 | 1 | 0 | 0 | 1 | 0 | 0 |
| 39 | 1 | 0 | 0 | 0 | 1 | 0 | 1 | 1 | 0 | 0 |
| 40 | 1 | 0 | 0 | 0 | 0 | 1 | 0 | 0 | 0 | 0 |
| 41 | 1 | 0 | 0 | 0 | 0 | 1 | 1 | 0 | 0 | 0 |
| 42 | 1 | 0 | 0 | 0 | 0 | 1 | 0 | 1 | 0 | 0 |
| 43 | 1 | 0 | 0 | 0 | 0 | 1 | 1 | 1 | 0 | 0 |
| 44 | 1 | 0 | 0 | 0 | 1 | 1 | 0 | 0 | 0 | 0 |
| 45 | 1 | 0 | 0 | 0 | 1 | 1 | 1 | 0 | 0 | 0 |
| 46 | 1 | 0 | 0 | 0 | 1 | 1 | 0 | 1 | 0 | 0 |
| 47 | 1 | 0 | 0 | 0 | 1 | 1 | 1 | 1 | 0 | 0 |
| 48 | 1 | 0 | 1 | 0 | 0 | 0 | 0 | 0 | 0 | 0 |
| 49 | 1 | 0 | 1 | 0 | 0 | 0 | 1 | 0 | 0 | 0 |
| 50 | 1 | 0 | 1 | 0 | 0 | 0 | 0 | 1 | 0 | 0 |
| 51 | 1 | 0 | 1 | 0 | 0 | 0 | 1 | 1 | 0 | 0 |
| 52 | 1 | 0 | 1 | 0 | 1 | 0 | 0 | 0 | 0 | 0 |
| 53 | 1 | 0 | 1 | 0 | 1 | 0 | 1 | 0 | 0 | 0 |
| 54 | 1 | 0 | 1 | 0 | 1 | 0 | 0 | 1 | 0 | 0 |
| 55 | 1 | 0 | 1 | 0 | 1 | 0 | 1 | 1 | 0 | 0 |
| 56 | 1 | 0 | 1 | 0 | 0 | 1 | 0 | 0 | 0 | 0 |
| 57 | 1 | 0 | 1 | 0 | 0 | 1 | 1 | 0 | 0 | 0 |
| 58 | 1 | 0 | 1 | 0 | 0 | 1 | 0 | 1 | 0 | 0 |
| 59 | 1 | 0 | 1 | 0 | 0 | 1 | 1 | 1 | 0 | 0 |
| 60 | 1 | 0 | 1 | 0 | 1 | 1 | 0 | 0 | 0 | 0 |
| 61 | 1 | 0 | 1 | 0 | 1 | 1 | 1 | 0 | 0 | 0 |
| 62 | 1 | 0 | 1 | 0 | 1 | 1 | 0 | 1 | 0 | 0 |
| 63 | 1 | 0 | 1 | 0 | 1 | 1 | 1 | 1 | 0 | 0 |
| 64 | 0 | 1 | 0 | 0 | 0 | 0 | 0 | 0 | 0 | 0 |
| 65 | 0 | 1 | 0 | 0 | 0 | 0 | 1 | 0 | 0 | 0 |
| 66 | 0 | 1 | 0 | 0 | 0 | 0 | 0 | 1 | 0 | 0 |
| 67 | 0 | 1 | 0 | 0 | 0 | 0 | 1 | 1 | 0 | 0 |
| 68 | 0 | 1 | 0 | 0 | 1 | 0 | 0 | 0 | 0 | 0 |
| 69 | 0 | 1 | 0 | 0 | 1 | 0 | 1 | 0 | 0 | 0 |
| 70 | 0 | 1 | 0 | 0 | 1 | 0 | 0 | 1 | 0 | 0 |
| 71 | 0 | 1 | 0 | 0 | 1 | 0 | 1 | 1 | 0 | 0 |
| 72 | 0 | 1 | 0 | 0 | 0 | 1 | 0 | 0 | 0 | 0 |
| 73 | 0 | 1 | 0 | 0 | 0 | 1 | 1 | 0 | 0 | 0 |
| 74 | 0 | 1 | 0 | 0 | 0 | 1 | 0 | 1 | 0 | 0 |
| 75 | 0 | 1 | 0 | 0 | 0 | 1 | 1 | 1 | 0 | 0 |
| 76 | 0 | 1 | 0 | 0 | 1 | 1 | 0 | 0 | 0 | 0 |
| 77 | 0 | 1 | 0 | 0 | 1 | 1 | 1 | 0 | 0 | 0 |
| 78 | 0 | 1 | 0 | 0 | 1 | 1 | 0 | 1 | 0 | 0 |
| 79 | 0 | 1 | 0 | 0 | 1 | 1 | 1 | 1 | 0 | 0 |
| 80 | 0 | 1 | 1 | 0 | 0 | 0 | 0 | 0 | 0 | 0 |
| 81 | 0 | 1 | 1 | 0 | 0 | 0 | 1 | 0 | 0 | 0 |
| 82 | 0 | 1 | 1 | 0 | 0 | 0 | 0 | 1 | 0 | 0 |
| 83 | 0 | 1 | 1 | 0 | 0 | 0 | 1 | 1 | 0 | 0 |
| 84 | 0 | 1 | 1 | 0 | 1 | 0 | 0 | 0 | 0 | 0 |
| 85 | 0 | 1 | 1 | 0 | 1 | 0 | 1 | 0 | 0 | 0 |

FIG. 25b lookup1

| | | | | | | | | | | |
|---|---|---|---|---|---|---|---|---|---|---|
| 86 | 0 | 1 | 1 | 0 | 1 | 0 | 0 | 1 | 0 | 0 |
| 87 | 0 | 1 | 1 | 0 | 1 | 0 | 1 | 1 | 0 | 0 |
| 88 | 0 | 1 | 1 | 0 | 0 | 1 | 0 | 0 | 0 | 0 |
| 89 | 0 | 1 | 1 | 0 | 0 | 1 | 1 | 0 | 0 | 0 |
| 90 | 0 | 1 | 1 | 0 | 0 | 1 | 0 | 1 | 0 | 0 |
| 91 | 0 | 1 | 1 | 0 | 0 | 1 | 1 | 1 | 0 | 0 |
| 92 | 0 | 1 | 1 | 0 | 1 | 1 | 0 | 0 | 0 | 0 |
| 93 | 0 | 1 | 1 | 0 | 1 | 1 | 1 | 0 | 0 | 0 |
| 94 | 0 | 1 | 1 | 0 | 1 | 1 | 0 | 1 | 0 | 0 |
| 95 | 0 | 1 | 1 | 0 | 1 | 1 | 1 | 1 | 0 | 0 |
| 96 | 1 | 1 | 0 | 0 | 0 | 0 | 0 | 0 | 0 | 0 |
| 97 | 1 | 1 | 0 | 0 | 0 | 0 | 1 | 0 | 0 | 0 |
| 98 | 1 | 1 | 0 | 0 | 0 | 0 | 0 | 1 | 0 | 0 |
| 99 | 1 | 1 | 0 | 0 | 0 | 0 | 1 | 1 | 0 | 0 |
| 100 | 1 | 1 | 0 | 0 | 1 | 0 | 0 | 0 | 0 | 0 |
| 101 | 1 | 1 | 0 | 0 | 1 | 0 | 1 | 0 | 0 | 0 |
| 102 | 1 | 1 | 0 | 0 | 1 | 0 | 0 | 1 | 0 | 0 |
| 103 | 1 | 1 | 0 | 0 | 1 | 0 | 1 | 1 | 0 | 0 |
| 104 | 1 | 1 | 0 | 0 | 0 | 1 | 0 | 0 | 0 | 0 |
| 105 | 1 | 1 | 0 | 0 | 0 | 1 | 1 | 0 | 0 | 0 |
| 106 | 1 | 1 | 0 | 0 | 0 | 1 | 0 | 1 | 0 | 0 |
| 107 | 1 | 1 | 0 | 0 | 0 | 1 | 1 | 1 | 0 | 0 |
| 108 | 1 | 1 | 0 | 0 | 1 | 1 | 0 | 0 | 0 | 0 |
| 109 | 1 | 1 | 0 | 0 | 1 | 1 | 1 | 0 | 0 | 0 |
| 110 | 1 | 1 | 0 | 0 | 1 | 1 | 0 | 1 | 0 | 0 |
| 111 | 1 | 1 | 0 | 0 | 1 | 1 | 1 | 1 | 0 | 0 |
| 112 | 1 | 1 | 1 | 0 | 0 | 0 | 0 | 0 | 0 | 0 |
| 113 | 1 | 1 | 1 | 0 | 0 | 0 | 1 | 0 | 0 | 0 |
| 114 | 1 | 1 | 1 | 0 | 0 | 0 | 0 | 1 | 0 | 0 |
| 115 | 1 | 1 | 1 | 0 | 0 | 0 | 1 | 1 | 0 | 0 |
| 116 | 1 | 1 | 1 | 0 | 1 | 0 | 0 | 0 | 0 | 0 |
| 117 | 1 | 1 | 1 | 0 | 1 | 0 | 1 | 0 | 0 | 0 |
| 118 | 1 | 1 | 1 | 0 | 1 | 0 | 0 | 1 | 0 | 0 |
| 119 | 1 | 1 | 1 | 0 | 1 | 0 | 1 | 1 | 0 | 0 |
| 120 | 1 | 1 | 1 | 0 | 0 | 1 | 0 | 0 | 0 | 0 |
| 121 | 1 | 1 | 1 | 0 | 0 | 1 | 1 | 0 | 0 | 0 |
| 122 | 1 | 1 | 1 | 0 | 0 | 1 | 0 | 1 | 0 | 0 |
| 123 | 1 | 1 | 1 | 0 | 0 | 1 | 1 | 1 | 0 | 0 |
| 124 | 1 | 1 | 1 | 0 | 1 | 1 | 0 | 0 | 0 | 0 |
| 125 | 1 | 1 | 1 | 0 | 1 | 1 | 1 | 0 | 0 | 0 |
| 126 | 1 | 1 | 1 | 0 | 1 | 1 | 0 | 1 | 0 | 0 |
| 127 | 1 | 1 | 1 | 0 | 1 | 1 | 1 | 1 | 0 | 0 |
| 128 | 1 | 1 | 0 | 1 | 0 | 0 | 0 | 0 | 0 | 0 |
| 129 | 1 | 1 | 0 | 1 | 0 | 0 | 1 | 0 | 0 | 0 |
| 130 | 1 | 1 | 0 | 1 | 0 | 0 | 0 | 1 | 0 | 0 |
| 131 | 1 | 1 | 0 | 1 | 0 | 0 | 1 | 1 | 0 | 0 |
| 132 | 1 | 1 | 0 | 1 | 1 | 0 | 0 | 0 | 0 | 0 |
| 133 | 1 | 1 | 0 | 1 | 1 | 0 | 1 | 0 | 0 | 0 |
| 134 | 1 | 1 | 0 | 1 | 1 | 0 | 0 | 1 | 0 | 0 |
| 135 | 1 | 1 | 0 | 1 | 1 | 0 | 1 | 1 | 0 | 0 |
| 136 | 1 | 1 | 0 | 1 | 0 | 1 | 0 | 0 | 0 | 0 |
| 137 | 1 | 1 | 0 | 1 | 0 | 1 | 1 | 0 | 0 | 0 |
| 138 | 1 | 1 | 0 | 1 | 0 | 1 | 0 | 1 | 0 | 0 |
| 139 | 1 | 1 | 0 | 1 | 0 | 1 | 1 | 1 | 0 | 0 |
| 140 | 1 | 1 | 0 | 1 | 1 | 1 | 0 | 0 | 0 | 0 |
| 141 | 1 | 1 | 0 | 1 | 1 | 1 | 1 | 0 | 0 | 0 |
| 142 | 1 | 1 | 0 | 1 | 1 | 1 | 0 | 1 | 0 | 0 |
| 143 | 1 | 1 | 0 | 1 | 1 | 1 | 1 | 1 | 0 | 0 |
| 144 | 1 | 1 | 1 | 1 | 0 | 0 | 0 | 0 | 0 | 0 |
| 145 | 1 | 1 | 1 | 1 | 0 | 0 | 1 | 0 | 0 | 0 |
| 146 | 1 | 1 | 1 | 1 | 0 | 0 | 0 | 1 | 0 | 0 |
| 147 | 1 | 1 | 1 | 1 | 0 | 0 | 1 | 1 | 0 | 0 |
| 148 | 1 | 1 | 1 | 1 | 1 | 0 | 0 | 0 | 0 | 0 |
| 149 | 1 | 1 | 1 | 1 | 1 | 0 | 1 | 0 | 0 | 0 |
| 150 | 1 | 1 | 1 | 1 | 1 | 0 | 0 | 1 | 0 | 0 |
| 151 | 1 | 1 | 1 | 1 | 1 | 0 | 1 | 1 | 0 | 0 |
| 152 | 1 | 1 | 1 | 1 | 0 | 1 | 0 | 0 | 0 | 0 |
| 153 | 1 | 1 | 1 | 1 | 0 | 1 | 1 | 0 | 0 | 0 |
| 154 | 1 | 1 | 1 | 1 | 0 | 1 | 0 | 1 | 0 | 0 |
| 155 | 1 | 1 | 1 | 1 | 0 | 1 | 1 | 1 | 0 | 0 |
| 156 | 1 | 1 | 1 | 1 | 1 | 1 | 0 | 0 | 0 | 0 |
| 157 | 1 | 1 | 1 | 1 | 1 | 1 | 1 | 0 | 0 | 0 |
| 158 | 1 | 1 | 1 | 1 | 1 | 1 | 0 | 1 | 0 | 0 |
| 159 | 1 | 1 | 1 | 1 | 1 | 1 | 1 | 1 | 0 | 0 |
| 160 | 1 | 1 | 0 | 1 | 0 | 0 | 0 | 0 | 1 | 0 |
| 161 | 1 | 1 | 0 | 1 | 0 | 0 | 1 | 0 | 1 | 0 |
| 162 | 1 | 1 | 0 | 1 | 0 | 0 | 0 | 1 | 1 | 0 |
| 163 | 1 | 1 | 0 | 1 | 0 | 0 | 1 | 1 | 1 | 0 |
| 164 | 1 | 1 | 0 | 1 | 1 | 0 | 0 | 0 | 1 | 0 |
| 165 | 1 | 1 | 0 | 1 | 1 | 0 | 1 | 0 | 1 | 0 |
| 166 | 1 | 1 | 0 | 1 | 1 | 0 | 0 | 1 | 1 | 0 |
| 167 | 1 | 1 | 0 | 1 | 1 | 0 | 1 | 1 | 1 | 0 |
| 168 | 1 | 1 | 0 | 1 | 0 | 1 | 0 | 0 | 1 | 0 |
| 169 | 1 | 1 | 0 | 1 | 0 | 1 | 1 | 0 | 1 | 0 |
| 170 | 1 | 1 | 0 | 1 | 0 | 1 | 0 | 1 | 1 | 0 |
| 171 | 1 | 1 | 0 | 1 | 0 | 1 | 1 | 1 | 1 | 0 |
| 172 | 1 | 1 | 0 | 1 | 1 | 1 | 0 | 0 | 1 | 0 |

FIG. 25c lookup1

| | | | | | | | | | | |
|---|---|---|---|---|---|---|---|---|---|---|
| 173 | 1 | 1 | 0 | 1 | 1 | 1 | 1 | 0 | 1 | 0 |
| 174 | 1 | 1 | 0 | 1 | 1 | 1 | 0 | 1 | 1 | 0 |
| 175 | 1 | 1 | 0 | 1 | 1 | 1 | 1 | 1 | 1 | 0 |
| 176 | 1 | 1 | 1 | 1 | 0 | 0 | 0 | 0 | 1 | 0 |
| 177 | 1 | 1 | 1 | 1 | 0 | 0 | 1 | 0 | 1 | 0 |
| 178 | 1 | 1 | 1 | 1 | 0 | 0 | 0 | 1 | 1 | 0 |
| 179 | 1 | 1 | 1 | 1 | 0 | 0 | 1 | 1 | 1 | 0 |
| 180 | 1 | 1 | 1 | 1 | 1 | 0 | 0 | 0 | 1 | 0 |
| 181 | 1 | 1 | 1 | 1 | 1 | 0 | 1 | 0 | 1 | 0 |
| 182 | 1 | 1 | 1 | 1 | 1 | 0 | 0 | 1 | 1 | 0 |
| 183 | 1 | 1 | 1 | 1 | 1 | 0 | 1 | 1 | 1 | 0 |
| 184 | 1 | 1 | 1 | 1 | 0 | 1 | 0 | 0 | 1 | 0 |
| 185 | 1 | 1 | 1 | 1 | 0 | 1 | 1 | 0 | 1 | 0 |
| 186 | 1 | 1 | 1 | 1 | 0 | 1 | 0 | 1 | 1 | 0 |
| 187 | 1 | 1 | 1 | 1 | 0 | 1 | 1 | 1 | 1 | 0 |
| 188 | 1 | 1 | 1 | 1 | 1 | 1 | 0 | 0 | 1 | 0 |
| 189 | 1 | 1 | 1 | 1 | 1 | 1 | 1 | 0 | 1 | 0 |
| 190 | 1 | 1 | 1 | 1 | 1 | 1 | 0 | 1 | 1 | 0 |
| 191 | 1 | 1 | 1 | 1 | 1 | 1 | 1 | 1 | 1 | 0 |
| 192 | 1 | 1 | 0 | 1 | 0 | 0 | 0 | 0 | 0 | 1 |
| 193 | 1 | 1 | 0 | 1 | 0 | 0 | 1 | 0 | 0 | 1 |
| 194 | 1 | 1 | 0 | 1 | 0 | 0 | 0 | 1 | 0 | 1 |
| 195 | 1 | 1 | 0 | 1 | 0 | 0 | 1 | 1 | 0 | 1 |
| 196 | 1 | 1 | 0 | 1 | 1 | 0 | 0 | 0 | 0 | 1 |
| 197 | 1 | 1 | 0 | 1 | 1 | 0 | 1 | 0 | 0 | 1 |
| 198 | 1 | 1 | 0 | 1 | 1 | 0 | 0 | 1 | 0 | 1 |
| 199 | 1 | 1 | 0 | 1 | 1 | 0 | 1 | 1 | 0 | 1 |
| 200 | 1 | 1 | 0 | 1 | 0 | 1 | 0 | 0 | 0 | 1 |
| 201 | 1 | 1 | 0 | 1 | 0 | 1 | 1 | 0 | 0 | 1 |
| 202 | 1 | 1 | 0 | 1 | 0 | 1 | 0 | 1 | 0 | 1 |
| 203 | 1 | 1 | 0 | 1 | 0 | 1 | 1 | 1 | 0 | 1 |
| 204 | 1 | 1 | 0 | 1 | 1 | 1 | 0 | 0 | 0 | 1 |
| 205 | 1 | 1 | 0 | 1 | 1 | 1 | 1 | 0 | 0 | 1 |
| 206 | 1 | 1 | 0 | 1 | 1 | 1 | 0 | 1 | 0 | 1 |
| 207 | 1 | 1 | 0 | 1 | 1 | 1 | 1 | 1 | 0 | 1 |
| 208 | 1 | 1 | 1 | 1 | 0 | 0 | 0 | 0 | 0 | 1 |
| 209 | 1 | 1 | 1 | 1 | 0 | 0 | 1 | 0 | 0 | 1 |
| 210 | 1 | 1 | 1 | 1 | 0 | 0 | 0 | 1 | 0 | 1 |
| 211 | 1 | 1 | 1 | 1 | 0 | 0 | 1 | 1 | 0 | 1 |
| 212 | 1 | 1 | 1 | 1 | 1 | 0 | 0 | 0 | 0 | 1 |
| 213 | 1 | 1 | 1 | 1 | 1 | 0 | 1 | 0 | 0 | 1 |
| 214 | 1 | 1 | 1 | 1 | 1 | 0 | 0 | 1 | 0 | 1 |
| 215 | 1 | 1 | 1 | 1 | 1 | 0 | 1 | 1 | 0 | 1 |
| 216 | 1 | 1 | 1 | 1 | 0 | 1 | 0 | 0 | 0 | 1 |
| 217 | 1 | 1 | 1 | 1 | 0 | 1 | 1 | 0 | 0 | 1 |
| 218 | 1 | 1 | 1 | 1 | 0 | 1 | 0 | 1 | 0 | 1 |
| 219 | 1 | 1 | 1 | 1 | 0 | 1 | 1 | 1 | 0 | 1 |
| 220 | 1 | 1 | 1 | 1 | 1 | 1 | 0 | 0 | 0 | 1 |
| 221 | 1 | 1 | 1 | 1 | 1 | 1 | 1 | 0 | 0 | 1 |
| 222 | 1 | 1 | 1 | 1 | 1 | 1 | 0 | 1 | 0 | 1 |
| 223 | 1 | 1 | 1 | 1 | 1 | 1 | 1 | 1 | 0 | 1 |
| 224 | 1 | 1 | 0 | 1 | 0 | 0 | 0 | 0 | 1 | 1 |
| 225 | 1 | 1 | 0 | 1 | 0 | 0 | 1 | 0 | 1 | 1 |
| 226 | 1 | 1 | 0 | 1 | 0 | 0 | 0 | 1 | 1 | 1 |
| 227 | 1 | 1 | 0 | 1 | 0 | 0 | 1 | 1 | 1 | 1 |
| 228 | 1 | 1 | 0 | 1 | 1 | 0 | 0 | 0 | 1 | 1 |
| 229 | 1 | 1 | 0 | 1 | 1 | 0 | 1 | 0 | 1 | 1 |
| 230 | 1 | 1 | 0 | 1 | 1 | 0 | 0 | 1 | 1 | 1 |
| 231 | 1 | 1 | 0 | 1 | 1 | 0 | 1 | 1 | 1 | 1 |
| 232 | 1 | 1 | 0 | 1 | 0 | 1 | 0 | 0 | 1 | 1 |
| 233 | 1 | 1 | 0 | 1 | 0 | 1 | 1 | 0 | 1 | 1 |
| 234 | 1 | 1 | 0 | 1 | 0 | 1 | 0 | 1 | 1 | 1 |
| 235 | 1 | 1 | 0 | 1 | 0 | 1 | 1 | 1 | 1 | 1 |
| 236 | 1 | 1 | 0 | 1 | 1 | 1 | 0 | 0 | 1 | 1 |
| 237 | 1 | 1 | 0 | 1 | 1 | 1 | 1 | 0 | 1 | 1 |
| 238 | 1 | 1 | 0 | 1 | 1 | 1 | 0 | 1 | 1 | 1 |
| 239 | 1 | 1 | 0 | 1 | 1 | 1 | 1 | 1 | 1 | 1 |
| 240 | 1 | 1 | 1 | 1 | 0 | 0 | 0 | 0 | 1 | 1 |
| 241 | 1 | 1 | 1 | 1 | 0 | 0 | 1 | 0 | 1 | 1 |
| 242 | 1 | 1 | 1 | 1 | 0 | 0 | 0 | 1 | 1 | 1 |
| 243 | 1 | 1 | 1 | 1 | 0 | 0 | 1 | 1 | 1 | 1 |
| 244 | 1 | 1 | 1 | 1 | 1 | 0 | 0 | 0 | 1 | 1 |
| 245 | 1 | 1 | 1 | 1 | 1 | 0 | 1 | 0 | 1 | 1 |
| 246 | 1 | 1 | 1 | 1 | 1 | 0 | 0 | 1 | 1 | 1 |
| 247 | 1 | 1 | 1 | 1 | 1 | 0 | 1 | 1 | 1 | 1 |
| 248 | 1 | 1 | 1 | 1 | 0 | 1 | 0 | 0 | 1 | 1 |
| 249 | 1 | 1 | 1 | 1 | 0 | 1 | 1 | 0 | 1 | 1 |
| 250 | 1 | 1 | 1 | 1 | 0 | 1 | 0 | 1 | 1 | 1 |
| 251 | 1 | 1 | 1 | 1 | 0 | 1 | 1 | 1 | 1 | 1 |
| 252 | 1 | 1 | 1 | 1 | 1 | 1 | 0 | 0 | 1 | 1 |
| 253 | 1 | 1 | 1 | 1 | 1 | 1 | 1 | 0 | 1 | 1 |
| 254 | 1 | 1 | 1 | 1 | 1 | 1 | 0 | 1 | 1 | 1 |
| 255 | 1 | 1 | 1 | 1 | 1 | 1 | 1 | 1 | 1 | 1 |

FIG.26a lookup2

| | SD1 TD32 | SD2 TD32 | SD1 TD16 | SD2 TD16 | SD1 TD4 | SD2 TD4 | SD1 TD1 | SD2 TD1 | SD1 TD32 | SD2 TD32 |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 0 | 0 | 1 | 0 | 0 | 0 |
| 2 | 0 | 0 | 0 | 0 | 0 | 0 | 0 | 1 | 0 | 0 |
| 3 | 0 | 0 | 0 | 0 | 0 | 0 | 1 | 1 | 0 | 0 |
| 4 | 0 | 0 | 0 | 0 | 1 | 0 | 0 | 0 | 0 | 0 |
| 5 | 0 | 0 | 0 | 0 | 1 | 0 | 1 | 0 | 0 | 0 |
| 6 | 0 | 0 | 0 | 0 | 1 | 0 | 0 | 1 | 0 | 0 |
| 7 | 0 | 0 | 0 | 0 | 1 | 0 | 1 | 1 | 0 | 0 |
| 8 | 0 | 0 | 0 | 0 | 0 | 1 | 0 | 0 | 0 | 0 |
| 9 | 0 | 0 | 0 | 0 | 0 | 1 | 1 | 0 | 0 | 0 |
| 10 | 0 | 0 | 0 | 0 | 0 | 1 | 0 | 1 | 0 | 0 |
| 11 | 0 | 0 | 0 | 0 | 0 | 1 | 1 | 1 | 0 | 0 |
| 12 | 0 | 0 | 0 | 0 | 1 | 1 | 0 | 0 | 0 | 0 |
| 13 | 0 | 0 | 0 | 0 | 1 | 1 | 1 | 0 | 0 | 0 |
| 14 | 0 | 0 | 0 | 0 | 1 | 1 | 0 | 1 | 0 | 0 |
| 15 | 0 | 0 | 0 | 0 | 1 | 1 | 1 | 1 | 0 | 0 |
| 16 | 0 | 0 | 1 | 0 | 0 | 0 | 0 | 0 | 0 | 0 |
| 17 | 0 | 0 | 1 | 0 | 0 | 0 | 1 | 0 | 0 | 0 |
| 18 | 0 | 0 | 1 | 0 | 0 | 0 | 0 | 1 | 0 | 0 |
| 19 | 0 | 0 | 1 | 0 | 0 | 0 | 1 | 1 | 0 | 0 |
| 20 | 0 | 0 | 1 | 0 | 1 | 0 | 0 | 0 | 0 | 0 |
| 21 | 0 | 0 | 1 | 0 | 1 | 0 | 1 | 0 | 0 | 0 |
| 22 | 0 | 0 | 1 | 0 | 1 | 0 | 0 | 1 | 0 | 0 |
| 23 | 0 | 0 | 1 | 0 | 1 | 0 | 1 | 1 | 0 | 0 |
| 24 | 0 | 0 | 1 | 0 | 0 | 1 | 0 | 0 | 0 | 0 |
| 25 | 0 | 0 | 1 | 0 | 0 | 1 | 1 | 0 | 0 | 0 |
| 25 | 0 | 0 | 1 | 0 | 0 | 1 | 0 | 1 | 0 | 0 |
| 27 | 0 | 0 | 1 | 0 | 0 | 1 | 1 | 1 | 0 | 0 |
| 28 | 0 | 0 | 1 | 0 | 1 | 1 | 0 | 0 | 0 | 0 |
| 29 | 0 | 0 | 1 | 0 | 1 | 1 | 1 | 0 | 0 | 0 |
| 30 | 0 | 0 | 1 | 0 | 1 | 1 | 0 | 1 | 0 | 0 |
| 31 | 0 | 0 | 1 | 0 | 1 | 1 | 1 | 1 | 0 | 0 |
| 32 | 0 | 0 | 0 | 0 | 0 | 0 | 0 | 0 | 1 | 0 |
| 33 | 0 | 0 | 0 | 0 | 0 | 0 | 1 | 0 | 1 | 0 |
| 34 | 0 | 0 | 0 | 0 | 0 | 0 | 0 | 1 | 1 | 0 |
| 35 | 0 | 0 | 0 | 0 | 0 | 0 | 1 | 1 | 1 | 0 |
| 36 | 0 | 0 | 0 | 0 | 1 | 0 | 0 | 0 | 1 | 0 |
| 37 | 0 | 0 | 0 | 0 | 1 | 0 | 1 | 0 | 1 | 0 |
| 38 | 0 | 0 | 0 | 0 | 1 | 0 | 0 | 1 | 1 | 0 |
| 39 | 0 | 0 | 0 | 0 | 1 | 0 | 1 | 1 | 1 | 0 |
| 40 | 0 | 0 | 0 | 0 | 0 | 1 | 0 | 0 | 1 | 0 |
| 41 | 0 | 0 | 0 | 0 | 0 | 1 | 1 | 0 | 1 | 0 |
| 42 | 0 | 0 | 0 | 0 | 0 | 1 | 0 | 1 | 1 | 0 |
| 43 | 0 | 0 | 0 | 0 | 0 | 1 | 1 | 1 | 1 | 0 |
| 44 | 0 | 0 | 0 | 0 | 1 | 1 | 0 | 0 | 1 | 0 |
| 45 | 0 | 0 | 0 | 0 | 1 | 1 | 1 | 0 | 1 | 0 |
| 46 | 0 | 0 | 0 | 0 | 1 | 1 | 0 | 1 | 1 | 0 |
| 47 | 0 | 0 | 0 | 0 | 1 | 1 | 1 | 1 | 1 | 0 |
| 48 | 0 | 0 | 1 | 0 | 0 | 0 | 0 | 0 | 1 | 0 |
| 49 | 0 | 0 | 1 | 0 | 0 | 0 | 1 | 0 | 1 | 0 |
| 50 | 0 | 0 | 1 | 0 | 0 | 0 | 0 | 1 | 1 | 0 |
| 51 | 0 | 0 | 1 | 0 | 0 | 0 | 1 | 1 | 1 | 0 |
| 52 | 0 | 0 | 1 | 0 | 1 | 0 | 0 | 0 | 1 | 0 |
| 53 | 0 | 0 | 1 | 0 | 1 | 0 | 1 | 0 | 1 | 0 |
| 54 | 0 | 0 | 1 | 0 | 1 | 0 | 0 | 1 | 1 | 0 |
| 55 | 0 | 0 | 1 | 0 | 1 | 0 | 1 | 1 | 1 | 0 |
| 56 | 0 | 0 | 1 | 0 | 0 | 1 | 0 | 0 | 1 | 0 |
| 57 | 0 | 0 | 1 | 0 | 0 | 1 | 1 | 0 | 1 | 0 |
| 58 | 0 | 0 | 1 | 0 | 0 | 1 | 0 | 1 | 1 | 0 |
| 59 | 0 | 0 | 1 | 0 | 0 | 1 | 1 | 1 | 1 | 0 |
| 60 | 0 | 0 | 1 | 0 | 1 | 1 | 0 | 0 | 1 | 0 |
| 61 | 0 | 0 | 1 | 0 | 1 | 1 | 1 | 0 | 1 | 0 |
| 62 | 0 | 0 | 1 | 0 | 1 | 1 | 0 | 1 | 1 | 0 |
| 63 | 0 | 0 | 1 | 0 | 1 | 1 | 1 | 1 | 1 | 0 |
| 64 | 0 | 0 | 0 | 0 | 0 | 0 | 0 | 0 | 0 | 1 |
| 65 | 0 | 0 | 0 | 0 | 0 | 0 | 1 | 0 | 0 | 1 |
| 66 | 0 | 0 | 0 | 0 | 0 | 0 | 0 | 1 | 0 | 1 |
| 67 | 0 | 0 | 0 | 0 | 0 | 0 | 1 | 1 | 0 | 1 |
| 68 | 0 | 0 | 0 | 0 | 1 | 0 | 0 | 0 | 0 | 1 |
| 69 | 0 | 0 | 0 | 0 | 1 | 0 | 1 | 0 | 0 | 1 |
| 70 | 0 | 0 | 0 | 0 | 1 | 0 | 0 | 1 | 0 | 1 |
| 71 | 0 | 0 | 0 | 0 | 1 | 0 | 1 | 1 | 0 | 1 |
| 72 | 0 | 0 | 0 | 0 | 0 | 1 | 0 | 0 | 0 | 1 |
| 73 | 0 | 0 | 0 | 0 | 0 | 1 | 1 | 0 | 0 | 1 |
| 74 | 0 | 0 | 0 | 0 | 0 | 1 | 0 | 1 | 0 | 1 |
| 75 | 0 | 0 | 0 | 0 | 0 | 1 | 1 | 1 | 0 | 1 |
| 76 | 0 | 0 | 0 | 0 | 1 | 1 | 0 | 0 | 0 | 1 |
| 77 | 0 | 0 | 0 | 0 | 1 | 1 | 1 | 0 | 0 | 1 |
| 78 | 0 | 0 | 0 | 0 | 1 | 1 | 0 | 1 | 0 | 1 |
| 79 | 0 | 0 | 0 | 0 | 1 | 1 | 1 | 1 | 0 | 1 |
| 80 | 0 | 0 | 1 | 0 | 0 | 0 | 0 | 0 | 0 | 1 |
| 81 | 0 | 0 | 1 | 0 | 0 | 0 | 1 | 0 | 0 | 1 |
| 82 | 0 | 0 | 1 | 0 | 0 | 0 | 0 | 1 | 0 | 1 |
| 83 | 0 | 0 | 1 | 0 | 0 | 0 | 1 | 1 | 0 | 1 |
| 84 | 0 | 0 | 1 | 0 | 1 | 0 | 0 | 0 | 0 | 1 |
| 85 | 0 | 0 | 1 | 0 | 1 | 0 | 1 | 0 | 0 | 1 |

FIG. 26b lookup2

| | | | | | | | | | | |
|---|---|---|---|---|---|---|---|---|---|---|
| 86 | 0 | 0 | 1 | 0 | 1 | 0 | 0 | 1 | 0 | 1 |
| 87 | 0 | 0 | 1 | 0 | 1 | 0 | 1 | 1 | 0 | 1 |
| 88 | 0 | 0 | 1 | 0 | 0 | 1 | 0 | 0 | 0 | 1 |
| 89 | 0 | 0 | 1 | 0 | 0 | 1 | 1 | 0 | 0 | 1 |
| 90 | 0 | 0 | 1 | 0 | 0 | 1 | 0 | 1 | 0 | 1 |
| 91 | 0 | 0 | 1 | 0 | 0 | 1 | 1 | 1 | 0 | 1 |
| 92 | 0 | 0 | 1 | 0 | 1 | 1 | 0 | 0 | 0 | 1 |
| 93 | 0 | 0 | 1 | 0 | 1 | 1 | 1 | 0 | 0 | 1 |
| 94 | 0 | 0 | 1 | 0 | 1 | 1 | 0 | 1 | 0 | 1 |
| 95 | 0 | 0 | 1 | 0 | 1 | 1 | 1 | 1 | 0 | 1 |
| 96 | 0 | 0 | 0 | 0 | 0 | 0 | 0 | 0 | 1 | 1 |
| 97 | 0 | 0 | 0 | 0 | 0 | 0 | 1 | 0 | 1 | 1 |
| 98 | 0 | 0 | 0 | 0 | 0 | 0 | 0 | 1 | 1 | 1 |
| 99 | 0 | 0 | 0 | 0 | 0 | 0 | 1 | 1 | 1 | 1 |
| 100 | 0 | 0 | 0 | 0 | 1 | 0 | 0 | 0 | 1 | 1 |
| 101 | 0 | 0 | 0 | 0 | 1 | 0 | 1 | 0 | 1 | 1 |
| 102 | 0 | 0 | 0 | 0 | 1 | 0 | 0 | 1 | 1 | 1 |
| 103 | 0 | 0 | 0 | 0 | 1 | 0 | 1 | 1 | 1 | 1 |
| 104 | 0 | 0 | 0 | 0 | 0 | 1 | 0 | 0 | 1 | 1 |
| 105 | 0 | 0 | 0 | 0 | 0 | 1 | 1 | 0 | 1 | 1 |
| 106 | 0 | 0 | 0 | 0 | 0 | 1 | 0 | 1 | 1 | 1 |
| 107 | 0 | 0 | 0 | 0 | 0 | 1 | 1 | 1 | 1 | 1 |
| 108 | 0 | 0 | 0 | 0 | 1 | 1 | 0 | 0 | 1 | 1 |
| 109 | 0 | 0 | 0 | 0 | 1 | 1 | 1 | 0 | 1 | 1 |
| 110 | 0 | 0 | 0 | 0 | 1 | 1 | 0 | 1 | 1 | 1 |
| 111 | 0 | 0 | 0 | 0 | 1 | 1 | 1 | 1 | 1 | 1 |
| 112 | 0 | 0 | 1 | 0 | 0 | 0 | 0 | 0 | 1 | 1 |
| 113 | 0 | 0 | 1 | 0 | 0 | 0 | 1 | 0 | 1 | 1 |
| 114 | 0 | 0 | 1 | 0 | 0 | 0 | 0 | 1 | 1 | 1 |
| 115 | 0 | 0 | 1 | 0 | 0 | 0 | 1 | 1 | 1 | 1 |
| 116 | 0 | 0 | 1 | 0 | 1 | 0 | 0 | 0 | 1 | 1 |
| 117 | 0 | 0 | 1 | 0 | 1 | 0 | 1 | 0 | 1 | 1 |
| 118 | 0 | 0 | 1 | 0 | 1 | 0 | 0 | 1 | 1 | 1 |
| 119 | 0 | 0 | 1 | 0 | 1 | 0 | 1 | 1 | 1 | 1 |
| 120 | 0 | 0 | 1 | 0 | 0 | 1 | 0 | 0 | 1 | 1 |
| 121 | 0 | 0 | 1 | 0 | 0 | 1 | 1 | 0 | 1 | 1 |
| 122 | 0 | 0 | 1 | 0 | 0 | 1 | 0 | 1 | 1 | 1 |
| 123 | 0 | 0 | 1 | 0 | 0 | 1 | 1 | 1 | 1 | 1 |
| 124 | 0 | 0 | 1 | 0 | 1 | 1 | 0 | 0 | 1 | 1 |
| 125 | 0 | 0 | 1 | 0 | 1 | 1 | 1 | 0 | 1 | 1 |
| 126 | 0 | 0 | 1 | 0 | 1 | 1 | 0 | 1 | 1 | 1 |
| 127 | 0 | 0 | 1 | 0 | 1 | 1 | 1 | 1 | 1 | 1 |
| 128 | 0 | 0 | 0 | 1 | 0 | 0 | 0 | 0 | 1 | 1 |
| 129 | 0 | 0 | 0 | 1 | 0 | 0 | 1 | 0 | 1 | 1 |
| 130 | 0 | 0 | 0 | 1 | 0 | 0 | 0 | 1 | 1 | 1 |
| 131 | 0 | 0 | 0 | 1 | 0 | 0 | 1 | 1 | 1 | 1 |
| 132 | 0 | 0 | 0 | 1 | 1 | 0 | 0 | 0 | 1 | 1 |
| 133 | 0 | 0 | 0 | 1 | 1 | 0 | 1 | 0 | 1 | 1 |
| 134 | 0 | 0 | 0 | 1 | 1 | 0 | 0 | 1 | 1 | 1 |
| 135 | 0 | 0 | 0 | 1 | 1 | 0 | 1 | 1 | 1 | 1 |
| 136 | 0 | 0 | 0 | 1 | 0 | 1 | 0 | 0 | 1 | 1 |
| 137 | 0 | 0 | 0 | 1 | 0 | 1 | 1 | 0 | 1 | 1 |
| 138 | 0 | 0 | 0 | 1 | 0 | 1 | 0 | 1 | 1 | 1 |
| 139 | 0 | 0 | 0 | 1 | 0 | 1 | 1 | 1 | 1 | 1 |
| 140 | 0 | 0 | 0 | 1 | 1 | 1 | 0 | 0 | 1 | 1 |
| 141 | 0 | 0 | 0 | 1 | 1 | 1 | 1 | 0 | 1 | 1 |
| 142 | 0 | 0 | 0 | 1 | 1 | 1 | 0 | 1 | 1 | 1 |
| 143 | 0 | 0 | 0 | 1 | 1 | 1 | 1 | 1 | 1 | 1 |
| 144 | 0 | 0 | 1 | 1 | 0 | 0 | 0 | 0 | 1 | 1 |
| 145 | 0 | 0 | 1 | 1 | 0 | 0 | 1 | 0 | 1 | 1 |
| 146 | 0 | 0 | 1 | 1 | 0 | 0 | 0 | 1 | 1 | 1 |
| 147 | 0 | 0 | 1 | 1 | 0 | 0 | 1 | 1 | 1 | 1 |
| 148 | 0 | 0 | 1 | 1 | 1 | 0 | 0 | 0 | 1 | 1 |
| 149 | 0 | 0 | 1 | 1 | 1 | 0 | 1 | 0 | 1 | 1 |
| 150 | 0 | 0 | 1 | 1 | 1 | 0 | 0 | 1 | 1 | 1 |
| 151 | 0 | 0 | 1 | 1 | 1 | 0 | 1 | 1 | 1 | 1 |
| 152 | 0 | 0 | 1 | 1 | 0 | 1 | 0 | 0 | 1 | 1 |
| 153 | 0 | 0 | 1 | 1 | 0 | 1 | 1 | 0 | 1 | 1 |
| 154 | 0 | 0 | 1 | 1 | 0 | 1 | 0 | 1 | 1 | 1 |
| 155 | 0 | 0 | 1 | 1 | 0 | 1 | 1 | 1 | 1 | 1 |
| 156 | 0 | 0 | 1 | 1 | 1 | 1 | 0 | 0 | 1 | 1 |
| 157 | 0 | 0 | 1 | 1 | 1 | 1 | 1 | 0 | 1 | 1 |
| 158 | 0 | 0 | 1 | 1 | 1 | 1 | 0 | 1 | 1 | 1 |
| 159 | 0 | 0 | 1 | 1 | 1 | 1 | 1 | 1 | 1 | 1 |
| 160 | 1 | 0 | 0 | 1 | 0 | 0 | 0 | 0 | 1 | 1 |
| 161 | 1 | 0 | 0 | 1 | 0 | 0 | 1 | 0 | 1 | 1 |
| 162 | 1 | 0 | 0 | 1 | 0 | 0 | 0 | 1 | 1 | 1 |
| 163 | 1 | 0 | 0 | 1 | 0 | 0 | 1 | 1 | 1 | 1 |
| 164 | 1 | 0 | 0 | 1 | 1 | 0 | 0 | 0 | 1 | 1 |
| 165 | 1 | 0 | 0 | 1 | 1 | 0 | 1 | 0 | 1 | 1 |
| 166 | 1 | 0 | 0 | 1 | 1 | 0 | 0 | 1 | 1 | 1 |
| 167 | 1 | 0 | 0 | 1 | 1 | 0 | 1 | 1 | 1 | 1 |
| 168 | 1 | 0 | 0 | 1 | 0 | 1 | 0 | 0 | 1 | 1 |
| 169 | 1 | 0 | 0 | 1 | 0 | 1 | 1 | 0 | 1 | 1 |
| 170 | 1 | 0 | 0 | 1 | 0 | 1 | 0 | 1 | 1 | 1 |
| 171 | 1 | 0 | 0 | 1 | 0 | 1 | 1 | 1 | 1 | 1 |
| 172 | 1 | 0 | 0 | 1 | 1 | 1 | 0 | 0 | 1 | 1 |

FIG 26c lookup2

| | | | | | | | | | | |
|---|---|---|---|---|---|---|---|---|---|---|
| 173 | 1 | 0 | 0 | 1 | 1 | 1 | 1 | 0 | 1 | 1 |
| 174 | 1 | 0 | 0 | 1 | 1 | 1 | 0 | 1 | 1 | 1 |
| 175 | 1 | 0 | 0 | 1 | 1 | 1 | 1 | 1 | 1 | 1 |
| 176 | 1 | 0 | 1 | 1 | 0 | 0 | 0 | 0 | 1 | 1 |
| 177 | 1 | 0 | 1 | 1 | 0 | 0 | 1 | 0 | 1 | 1 |
| 178 | 1 | 0 | 1 | 1 | 0 | 0 | 0 | 1 | 1 | 1 |
| 179 | 1 | 0 | 1 | 1 | 0 | 0 | 1 | 1 | 1 | 1 |
| 180 | 1 | 0 | 1 | 1 | 1 | 0 | 0 | 0 | 1 | 1 |
| 181 | 1 | 0 | 1 | 1 | 1 | 0 | 1 | 0 | 1 | 1 |
| 182 | 1 | 0 | 1 | 1 | 1 | 0 | 0 | 1 | 1 | 1 |
| 183 | 1 | 0 | 1 | 1 | 1 | 0 | 1 | 1 | 1 | 1 |
| 184 | 1 | 0 | 1 | 1 | 0 | 1 | 0 | 0 | 1 | 1 |
| 185 | 1 | 0 | 1 | 1 | 0 | 1 | 1 | 0 | 1 | 1 |
| 186 | 1 | 0 | 1 | 1 | 0 | 1 | 0 | 1 | 1 | 1 |
| 187 | 1 | 0 | 1 | 1 | 0 | 1 | 1 | 1 | 1 | 1 |
| 188 | 1 | 0 | 1 | 1 | 1 | 1 | 0 | 0 | 1 | 1 |
| 189 | 1 | 0 | 1 | 1 | 1 | 1 | 1 | 0 | 1 | 1 |
| 190 | 1 | 0 | 1 | 1 | 1 | 1 | 0 | 1 | 1 | 1 |
| 191 | 1 | 0 | 1 | 1 | 1 | 1 | 1 | 1 | 1 | 1 |
| 192 | 0 | 1 | 0 | 1 | 0 | 0 | 0 | 0 | 1 | 1 |
| 193 | 0 | 1 | 0 | 1 | 0 | 0 | 1 | 0 | 1 | 1 |
| 194 | 0 | 1 | 0 | 1 | 0 | 0 | 0 | 1 | 1 | 1 |
| 195 | 0 | 1 | 0 | 1 | 0 | 0 | 1 | 1 | 1 | 1 |
| 196 | 0 | 1 | 0 | 1 | 1 | 0 | 0 | 0 | 1 | 1 |
| 197 | 0 | 1 | 0 | 1 | 1 | 0 | 1 | 0 | 1 | 1 |
| 198 | 0 | 1 | 0 | 1 | 1 | 0 | 0 | 1 | 1 | 1 |
| 199 | 0 | 1 | 0 | 1 | 1 | 0 | 1 | 1 | 1 | 1 |
| 200 | 0 | 1 | 0 | 1 | 0 | 1 | 0 | 0 | 1 | 1 |
| 201 | 0 | 1 | 0 | 1 | 0 | 1 | 1 | 0 | 1 | 1 |
| 202 | 0 | 1 | 0 | 1 | 0 | 1 | 0 | 1 | 1 | 1 |
| 203 | 0 | 1 | 0 | 1 | 0 | 1 | 1 | 1 | 1 | 1 |
| 204 | 0 | 1 | 0 | 1 | 1 | 1 | 0 | 0 | 1 | 1 |
| 205 | 0 | 1 | 0 | 1 | 1 | 1 | 1 | 0 | 1 | 1 |
| 206 | 0 | 1 | 0 | 1 | 1 | 1 | 0 | 1 | 1 | 1 |
| 207 | 0 | 1 | 0 | 1 | 1 | 1 | 1 | 1 | 1 | 1 |
| 208 | 0 | 1 | 1 | 1 | 0 | 0 | 0 | 0 | 1 | 1 |
| 209 | 0 | 1 | 1 | 1 | 0 | 0 | 1 | 0 | 1 | 1 |
| 210 | 0 | 1 | 1 | 1 | 0 | 0 | 0 | 1 | 1 | 1 |
| 211 | 0 | 1 | 1 | 1 | 0 | 0 | 1 | 1 | 1 | 1 |
| 212 | 0 | 1 | 1 | 1 | 1 | 0 | 0 | 0 | 1 | 1 |
| 213 | 0 | 1 | 1 | 1 | 1 | 0 | 1 | 0 | 1 | 1 |
| 214 | 0 | 1 | 1 | 1 | 1 | 0 | 0 | 1 | 1 | 1 |
| 215 | 0 | 1 | 1 | 1 | 1 | 0 | 1 | 1 | 1 | 1 |
| 216 | 0 | 1 | 1 | 1 | 0 | 1 | 0 | 0 | 1 | 1 |
| 217 | 0 | 1 | 1 | 1 | 0 | 1 | 1 | 0 | 1 | 1 |
| 218 | 0 | 1 | 1 | 1 | 0 | 1 | 0 | 1 | 1 | 1 |
| 219 | 0 | 1 | 1 | 1 | 0 | 1 | 1 | 1 | 1 | 1 |
| 220 | 0 | 1 | 1 | 1 | 1 | 1 | 0 | 0 | 1 | 1 |
| 221 | 0 | 1 | 1 | 1 | 1 | 1 | 1 | 0 | 1 | 1 |
| 222 | 0 | 1 | 1 | 1 | 1 | 1 | 0 | 1 | 1 | 1 |
| 223 | 0 | 1 | 1 | 1 | 1 | 1 | 1 | 1 | 1 | 1 |
| 224 | 1 | 1 | 0 | 1 | 0 | 0 | 0 | 0 | 1 | 1 |
| 225 | 1 | 1 | 0 | 1 | 0 | 0 | 1 | 0 | 1 | 1 |
| 226 | 1 | 1 | 0 | 1 | 0 | 0 | 0 | 1 | 1 | 1 |
| 227 | 1 | 1 | 0 | 1 | 0 | 0 | 1 | 1 | 1 | 1 |
| 228 | 1 | 1 | 0 | 1 | 1 | 0 | 0 | 0 | 1 | 1 |
| 229 | 1 | 1 | 0 | 1 | 1 | 0 | 1 | 0 | 1 | 1 |
| 230 | 1 | 1 | 0 | 1 | 1 | 0 | 0 | 1 | 1 | 1 |
| 231 | 1 | 1 | 0 | 1 | 1 | 0 | 1 | 1 | 1 | 1 |
| 232 | 1 | 1 | 0 | 1 | 0 | 1 | 0 | 0 | 1 | 1 |
| 233 | 1 | 1 | 0 | 1 | 0 | 1 | 1 | 0 | 1 | 1 |
| 234 | 1 | 1 | 0 | 1 | 0 | 1 | 0 | 1 | 1 | 1 |
| 235 | 1 | 1 | 0 | 1 | 0 | 1 | 1 | 1 | 1 | 1 |
| 236 | 1 | 1 | 0 | 1 | 1 | 1 | 0 | 0 | 1 | 1 |
| 237 | 1 | 1 | 0 | 1 | 1 | 1 | 1 | 0 | 1 | 1 |
| 238 | 1 | 1 | 0 | 1 | 1 | 1 | 0 | 1 | 1 | 1 |
| 239 | 1 | 1 | 0 | 1 | 1 | 1 | 1 | 1 | 1 | 1 |
| 240 | 1 | 1 | 1 | 1 | 0 | 0 | 0 | 0 | 1 | 1 |
| 241 | 1 | 1 | 1 | 1 | 0 | 0 | 1 | 0 | 1 | 1 |
| 242 | 1 | 1 | 1 | 1 | 0 | 0 | 0 | 1 | 1 | 1 |
| 243 | 1 | 1 | 1 | 1 | 0 | 0 | 1 | 1 | 1 | 1 |
| 244 | 1 | 1 | 1 | 1 | 1 | 0 | 0 | 0 | 1 | 1 |
| 245 | 1 | 1 | 1 | 1 | 1 | 0 | 1 | 0 | 1 | 1 |
| 246 | 1 | 1 | 1 | 1 | 1 | 0 | 0 | 1 | 1 | 1 |
| 247 | 1 | 1 | 1 | 1 | 1 | 0 | 1 | 1 | 1 | 1 |
| 248 | 1 | 1 | 1 | 1 | 0 | 1 | 0 | 0 | 1 | 1 |
| 249 | 1 | 1 | 1 | 1 | 0 | 1 | 1 | 0 | 1 | 1 |
| 250 | 1 | 1 | 1 | 1 | 0 | 1 | 0 | 1 | 1 | 1 |
| 251 | 1 | 1 | 1 | 1 | 0 | 1 | 1 | 1 | 1 | 1 |
| 252 | 1 | 1 | 1 | 1 | 1 | 1 | 0 | 0 | 1 | 1 |
| 253 | 1 | 1 | 1 | 1 | 1 | 1 | 1 | 0 | 1 | 1 |
| 254 | 1 | 1 | 1 | 1 | 1 | 1 | 0 | 1 | 1 | 1 |
| 255 | 1 | 1 | 1 | 1 | 1 | 1 | 1 | 1 | 1 | 1 |

LIGHT MODULATING DEVICES

FIELD OF THE INVENTION

This invention relates to light modulating devices, and is concerned more particularly, but not exclusively, with liquid crystal display and optical shutter devices including spatial light modulators.

BACKGROUND OF THE INVENTION

It should be understood that the term "light modulating devices" is used in this specification to encompass both light transmissive light modulators, such as diffractive spatial modulators or conventional liquid crystal displays, light emissive modulators, such as electroluminescent or plasma displays, reflective or transflective devices or displays, and other spatial light modulators, such as optically addressed spatial light modulators or plasma addressed spatial light modulators.

Liquid crystal devices are commonly used for displaying alphanumeric information and/or graphic images. Furthermore liquid crystal devices are also used as optical shutters, for example in printers. Such liquid crystal devices comprise a matrix of individually addressable modulating elements which can be designed to produce not only black and white transmission levels, but also intermediate or "grey" transmission levels. In color devices, such as those employing color filters, such intermediate or grey transmission levels may be used to give a wider variety of colors or hues. The so-called grey scale response of such a device may be produced in a number of ways.

For example the grey scale response may be produced by modulating the transmission of each element between "on" and "off" states in dependence on the applied drive signal so as to provide different levels of analogue grey. In a twisted nematic device, for example, the transmission of each element may be determined by an applied RMS voltage and different levels of grey may be produced by suitable control of the voltage. In active matrix devices the voltage stored at the picture element similarly controls the grey level. On the other hand, it is more difficult to control the transmission in an analogue fashion in a bi-stable liquid crystal device, such as a ferroelectric liquid crystal device, although various methods have been proposed by which transmission may be controlled by modulating the voltage signal in such a device. In devices having no analogue grey scale, a grey scale response may be produced by so-called spatial or temporal dither techniques, or such techniques may be used to augment the analogue grey scale.

In a spatial dither (SD) technique each element is divided into two or more separately addressable sub-elements which are addressable by different combinations of switching signals in order to produce different overall levels of grey. For example, in the simple case of an element comprising with two equal sized sub-elements each of which is switchable between a white and a black state, three grey levels (including white and black) will be obtainable corresponding to both sub-elements being switched to the white state, both sub-elements being switched to the black state, and one sub-element being in the white state while the other sub-element is in the black state. Since both sub-elements are of the same size, the same grey level will be obtained regardless of which of the sub-elements is in the white state and which is in the black state, so that the switching circuit must be designed to take account of this level of redundancy. It is also possible for the sub-elements to be of different sizes so as to constitute two or more spatial bits of different significance, which will have the effect that different grey levels will be produced depending on which of the two sub-elements is in the white state and which is in the black state.

In a temporal dither (TD) technique at least part of each element is addressable by different time modulating signals in order to produce different overall levels of grey within the addressing frame. For example, in a simple case in which an element is addressable within the frame by two sub-frames of equal duration, the element may be arranged to be in the white state when it is addressed so as to be "on" in both sub-frames, and the element may be arranged to be in the dark state when it is addressed so as to be "off" in both sub-frames. Furthermore the element may be in an intermediate grey state when it is addressed so as to be "on" in one sub-frame and "off" in the other sub-frame. Alternatively the sub-frames may be of different durations so as to constitute two or more temporal bits of different significance. Furthermore it is possible to combine such a temporal dither technique with spatial dither by addressing one or more of the sub-elements in a spatial dither arrangement by different time modulated signals.

Temporal dither relies on the observer's eye averaging a series of periods of different transmission levels, for example black and white transmission levels, so as to perceive a particular grey level. As long as the transitions from one transmission level to any other are faster than the eye integration period no flicker is observed. However, if the transition period is close to the eye integration period, problems may be experienced when an element changes from one temporal grey level to another temporal grey level due to the tendency of the eye to integrate through the transition period between the two grey levels and the fact that a particular sequence of temporal bits over the transition may add up to a perceived transmission level which is not between the grey levels on either side of the transition, that is which is either greater than or less than both of these grey levels. Although such a transitional transmission level is not generally perceived in complex video images, this phenomenon may give rise to an artifact which becomes observable when smooth gradients in grey level move across a display. Since many transitions between grey levels may give rise to such an incorrect transitional grey level, and the amplitude of the error is largest in the case of transitions between consecutive grey levels, a bright or dark false contour, which may be termed a pseudo-edge, may be perceived in a moving image as a result of such a phenomenon. FIG. 5 diagrammatically illustrates the running average transmission level in such a case during a transition from a starting grey level 1 to an adjacent finishing grey level 2. In this case the transitional grey level passes first through a region 3 in which it is higher than both of the grey levels 1 and 2 and then through a region 4 in which it is lower than both of the grey levels 1 and 2, thus resulting in incorrect grey levels being observable momentarily during such a transition.

Y-W. Zhu et al., "A Motion-Dependent Equalizing-Pulse Technique for Reducing Dynamic False Contours on PDPs" Technical Report of IEICE. EID 96-60 (1996-11), pp. 67–72 discloses a means for compensating for dynamic false contours by an equalizing-pulse technique in which light emission periods are added or subtracted during such a transition in order to compensate for an erroneous transmission level less than or greater than the intended transmission level. However such a technique requires the use of a complicated algorithm which must include the speed of motion in the video signal in order to provide effective compensation.

SUMMARY OF THE INVENTION

It is an object of the invention to provide a light modulating device with arrangement enabling a large number of grey levels to be produced in such a manner as to limit the perceived errors at transitions between different grey levels whilst limiting circuit complexity.

According to the present invention there is provided a light modulating device furnished with an addressable matrix of modulating elements, and an addressing arrangement for selectively addressing each element within a series of addressing frames in order to vary the transmission level of the element relative to the transmission levels of the other elements, the addressing arrangement including a temporal dither arrangement for addressing each element within each frame with different combinations of temporal dither signals applied to separately addressable temporal bits within the frame to produce different overall transmission levels, wherein the temporal dither arrangement is arranged to address a first modulating element with a first combination of temporal dither signals to produce a first transmission level and to address a second modulating element with a second combination of temporal dither signals, which differs from the first combination of temporal dither signals, to produce the same first transmission level such that, during a transition between the first transmission level and a second transmission level, a transient in one direction in the transmission level of the first modulating element is at least partially compensated for by a transient in the opposite direction in the transmission level of the second modulating element.

The control of the addressing of the first and second modulating elements in this manner serves to limit the perceived errors at the transitions between different grey levels in a relatively straightforward manner.

Furthermore the temporal dither arrangement may be arranged to address the first modulating element with a third combination of temporal dither signals, which differs from the first and second combinations of temporal dither signals, to produce the second transmission level and to address the second modulating element with a fourth combination of temporal dither signals, which differs from the first, second and third combinations of temporal dither signals, to produce the same second transmission level. It should be appreciated that, in some embodiments, in which the addressing arrangement is adapted to vary the transmission level over a large range of values, some transitions may occur between transmission levels for which different combinations of temporal dither signals are applied to the modulating elements to produce each of the transmission levels, whereas other transitions may occur between transmission levels for which the same combination of signals is used to produce one of the transmission levels in both modulating elements whereas the other transmission level is produced by different combinations of signals applied to the two modulating elements.

Preferably the temporal dither arrangement is furnished with a first lookup table arrangement for supplying combinations of temporal dither signals to control the transmission level of the first modulating element and a second lookup table arrangement for supplying combinations of temporal dither signals to control the transmission level of the second modulating element.

In one embodiment the first lookup table arrangement is arranged to control the transmission levels of first modulating elements disposed along first rows or columns and the second lookup table arrangement is arranged to control the transmission levels of second modulating elements disposed along second rows or columns alternating with the first rows or columns.

In an alternative embodiment the first lookup table arrangement is arranged to control the transmission levels of first modulating elements and the second lookup table arrangement is arranged to control the transmission levels of second modulating elements which alternate with the first modulating elements along two mutually transverse directions.

In some embodiments different lookup table arrangements are used to control the transmission levels of the first and second modulating elements for some transmission levels, whereas the same lookup table arrangement is used to control the transmission levels of the first and second modulating elements for other transmission levels.

The temporal dither arrangement may be arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

Furthermore the temporal dither arrangement may be arranged to control the transmission levels of the first and second modulating elements such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

In a further development the temporal dither arrangement may be arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

In addition the temporal dither arrangement may be arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

BRIEF DESCRIPTION OF THE DRAWINGS

In order that the invention may be more fully understood, a number of different embodiments in accordance with the invention will now be described, by way of example, with reference to the accompanying drawings, in which:

FIGS. 19*a* and 19*b* show appropriate lookup tables which may be used in the first embodiment;

FIGS. 25*a*, 25*b* and 25*c* and 26*a*, 26*b* and 26*c* show two lookup tables which may be used in the second embodiment;

DESCRIPTION OF THE EMBODIMENTS

In the following analysis reference will be made to the statistical terms "mean" and "variance", and it should be understood that, for a frequency distribution in which a set of n observations $x_1, X_2, \ldots x_n$ occur with frequencies $f_1, f_2, \ldots, f_n$, these terms are defined by the following expressions:

$$\text{the mean } \bar{x} = \frac{1}{n}\sum f_r x_r, \text{ where } n = \sum f_r,$$

$$\text{the variance} = \frac{1}{n}\sum f_r(x_r - \bar{x})^2 = \frac{1}{n}\sum f_r x_r^2 - \bar{x}^2$$

where $x_r$ and $f_r$ denote each successive observation and frequency in accordance with standard mathematical notation.

Figure 1:
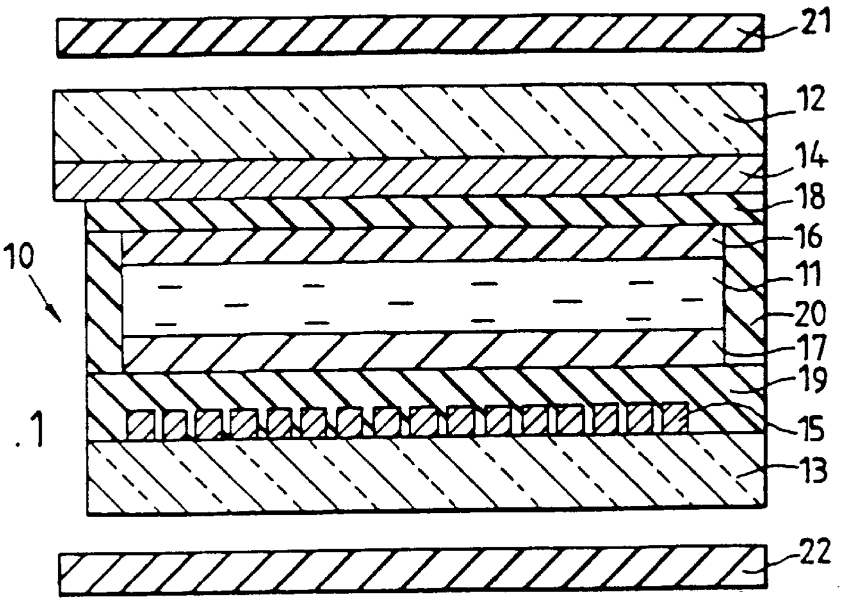
FIG. 1 is a diagrammatic section through a ferroelectric liquid crystal display panel.

The addressing arrangements to be described below are provided for addressing of a ferroelectric liquid crystal display (FLCD) panel 10, shown diagrammatically in FIG. 1, comprising a layer 11 of ferroelectric liquid crystal material contained between two parallel glass substrates 12 and 13 bearing first and second electrode structures on their inside surfaces. The first and second electrode structures comprise respectively a series of column and row electrode tracks 14 and 15 which cross one another at right angles to form an addressable matrix of modulating elements (pixels). Furthermore alignment layers 16 and 17 overlie insulating layers 18 and 19 applied on top of the column and row electrode tracks 14 and 15, so that the alignment layers 16 and 17 contact opposite sides of the liquid crystal layer 11 which is bounded at its edges by a sealing member 20. The panel 10 is disposed between polarizers 21 and 22 having polarizing axes which are substantially perpendicular to one another.

As is well known, the elements or pixels at the intersections of the row and column electrode tracks of such a panel are addressable by the application of suitable strobe and data pulses to the row and column electrodes. One such addressing scheme, which can be used to discriminate between two states, such as black and white, is disclosed in "The Joers/Alvey Ferroelectric Multiplexing Scheme", Ferroelectrics 1991, Vol. 122, pp. 63–79. Furthermore each pixel (or each sub-element of each pixel where the pixel is sub-divided into two or more sub-elements) may have n different analogue grey states dependent on the voltage waveform applied to switch the pixel or sub-element so that, in addition to the black and white states referred to above, the pixel or sub-element may have one or more intermediate grey states.

Figure 2:
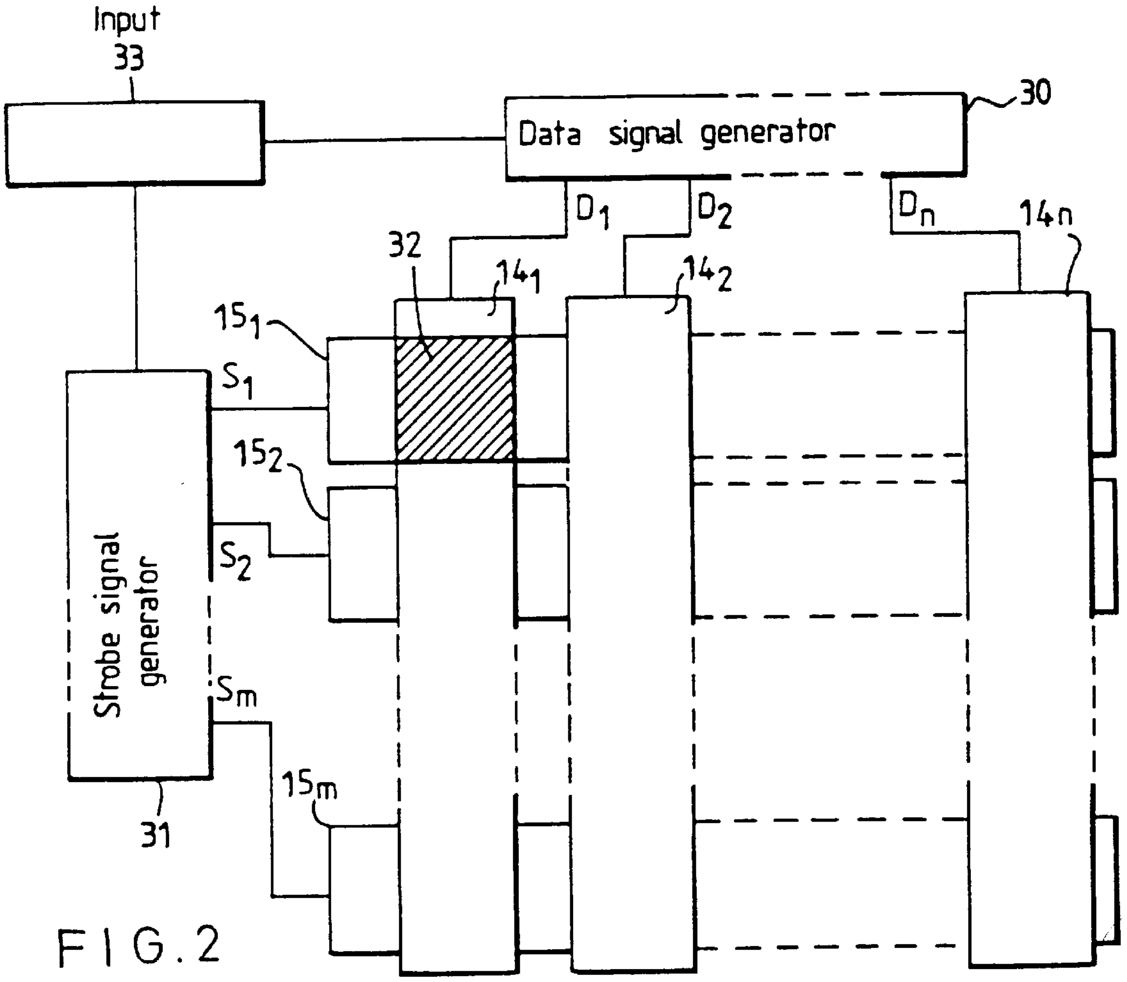
FIG. 2 is a schematic diagram of an addressing arrangement for such a panel.

FIG. 2 diagrammatically shows an addressing arrangement for such a panel 10 comprising a data signal generator 30 connected to the column electrode tracks $14_1, 14_2, \ldots, 14_n$ and a strobe signal generator 31 connected to the row electrode tracks $15_1, 15_2, \ldots, 15_m$. The addressable pixels 32 at the intersection of the row and column electrode tracks are addressed by data signals $D_1, D_2, \ldots, D_n$ supplied by the data signal generator 30 in association with strobe signals $S_1, S_2, \ldots, S_n$ supplied by the strobe generator 31 in known manner in response to appropriate image data supplied to the data signal generator 30 and clock signals supplied to the data and strobe signal generators 30 and 31 by a display input 33, which may incorporate spatial and/or temporal dither control circuitry for effecting spatial and/or temporal dither as explained with reference to FIGS. 3 and 4 below.

Figure 3:
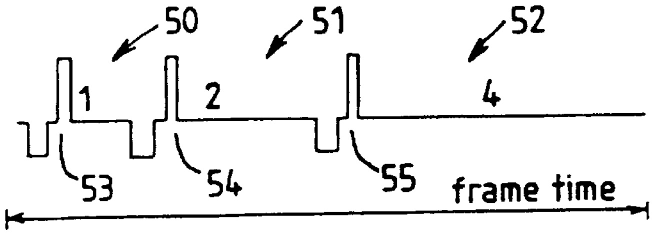
FIGS. 3 and 4 are explanatory diagrams illustrating temporal dither (TD) and spatial dither (SD) techniques usable in such a panel.
Figure 4:
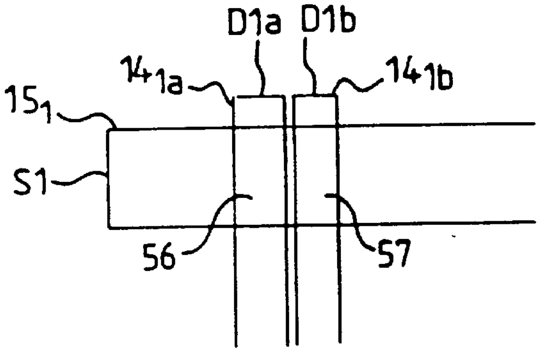
Figure 5:
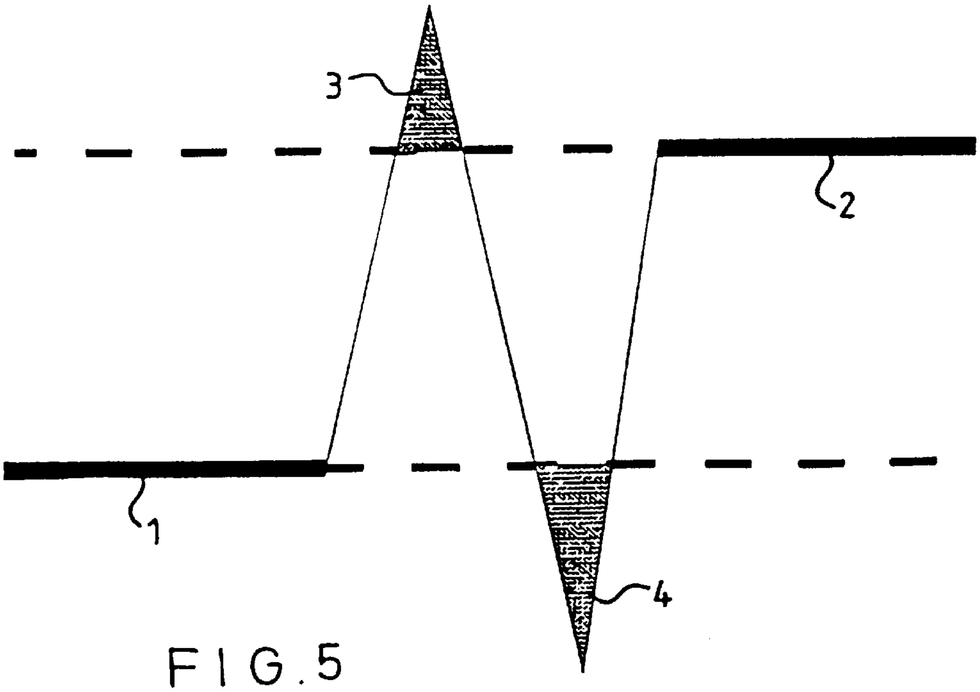
FIG. 5 is an explanatory diagram illustrating the manner in which an erroneous grey level may be observable at a transition between different grey levels.

FIG. 3 shows, by way of example, a strobe waveform which may be used to apply a temporal dither (TD) technique in which the timing of three strobe signals 53, 54 and 55 applied to a particular row electrode track during a frame time defines three select periods 50, 51 and 52 of durations in the ratio 1:2:4 during which a pixel can be switched to the black state, the white state or any intermediate analogue grey state depending on whether the data signal applied to the corresponding column electrode track is an "off" data signal or "on" data signal or an intermediate data signal. The perceived overall grey level within the frame is the average of the transmission levels within the three temporal bits defined by the select periods 50, 51 and 52. FIG. 4 diagrammatically illustrates, by way of example, the addressing of a pixel by a spatial dither (SD) technique where the pixel comprises two sub-pixels 56 and 57 formed at the intersection points of two column sub-electrode tracks $^{14}{}_{1a}$, $^{14}{}_{1b}$, and a row electrode track $\mathbf{15}_1$. In this spatial dither technique the transmission levels of the two sub-pixels 56 and 57 are controlled independently by the application of data signals $D_{1a}$, $D_{1b}$ to the sub-electrode tracks $\mathbf{14}_{1a}$, $\mathbf{14}_{1b}$ In this case the perceived overall grey level is the average of the transmission levels of the two sub-pixels 56 and 57 as determined by the applied data signals $D_{1a}$ and $D_{1b}$. Of course each pixel may be subdivided into any number of sub-pixels which may be separately addressable by spatial dither signals so that the overall transmission level of the pixel corresponds to the spatial average of the transmission levels of the sub-pixels, taking into account the relative areas of the sub-pixels. As is well known, a color pixel of a color display device generally comprises three sub-pixels, that is a red sub-pixel, a green sub-pixel and a blue sub-pixel, which are controllable by separate sub-electrodes to enable the full range of colors to be displayed. It will be appreciated that when SD is to be applied to such a color pixel, each of the color sub-pixels is itself subdivided into two or more sub-elements to which separate spatial dither signals can be supplied by corresponding sub-electrodes so as to allow for a range of transmission levels for each color.

Figure 6:
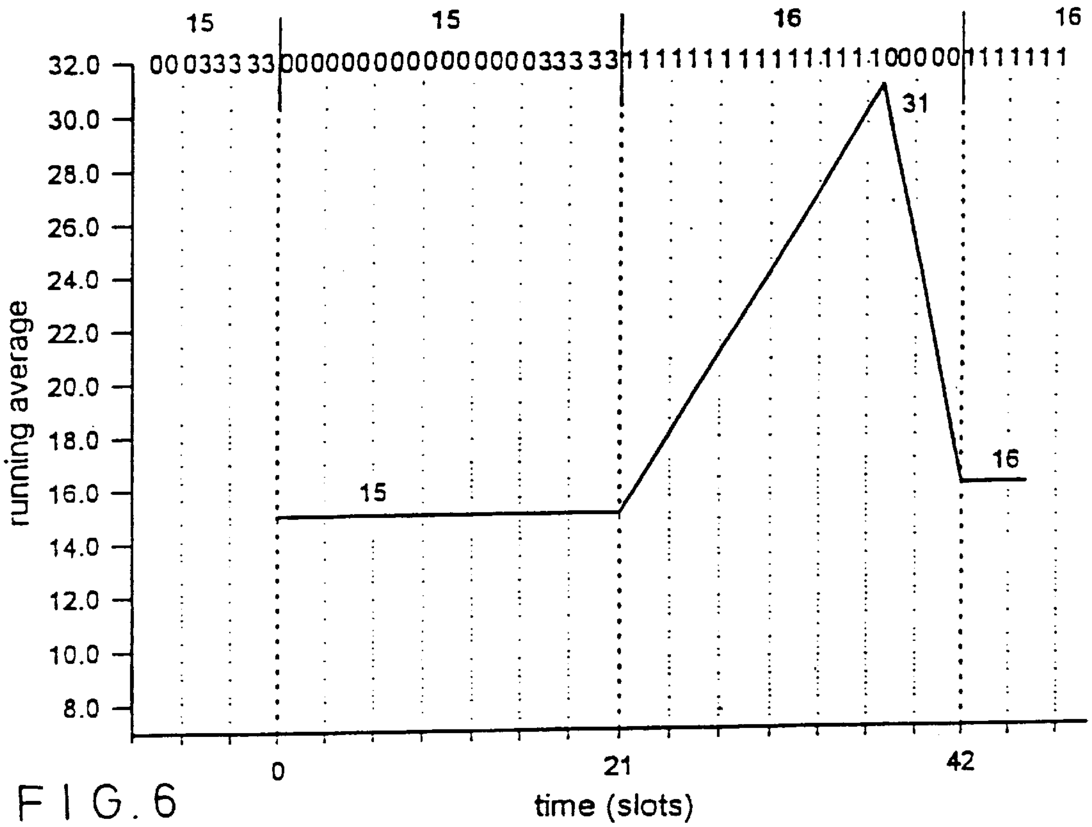
FIG. 6 is a graph illustrating the running average of the transmission level during a transition from grey level 15 to grey level 16 in a TD 16:4:1 SD 1:2 addressing arrangement.

Reference will now be made, by way of example, to a combined temporal/spatial dither addressing arrangement for such a display panel in which 3-bit temporal dither in the ratio 16:4:1 is combined with 2-bit spatial dither in the ratio 1:2 to enable 64 overall grey levels to be produced. In this case each grey level represents the average of the transmission levels over twenty-one time slots within an addressing frame where the first sixteen time slots represent the most significant temporal bit, the next four time slots represent the next most significant temporal bit and the last time slot represents the least significant temporal bit, and each of these temporal bits may have any one of the transmission levels 0, 1, 2 or 3 depending on whether neither, either or both of the corresponding grey levels is in the white state, that is on whether the spatial bits have the values 00, 01, 10 or 11. FIG. 6 is a graph of the variation of the perceived grey level, as represented by the running average of the transmission levels over twenty-one time slots, during a transition from the grey level 15 (represented by the level 0 in the most significant temporal bit and the level 3 in the next most significant and least significant temporal bit) to the grey level 16 (represented by the level 1 in the most significant temporal bit, and the level 0 in the next most significant and least significant temporal bits).

Considering the running average between the time slots 21 and 42 in FIG. 6 as the transition takes place from the grey level 15 to the grey level 16, it will be appreciated that the running average increases by one in each successive time slot (due to the fact that the initial time slots of the first frame of grey level 16 are at level 1 whereas the corresponding time slots of the final frame of grey level 15 are at level 0) until the maximum running average of 31 is reached in the final time slot of the most significant temporal bit of the first frame of grey level 16. Thereafter the running average decreases by three in each successive time slot (due to the next most significant and least significant temporal bits of the first frame of grey level 16 having values 0 whilst the corresponding bits of the last frame of grey level 15 have values 3) until the running average falls to the grey level 16 at the end of the frame. Thus, assuming that the eye averages over one frame time, there is a period of time within the transitional frame in which the integrated grey level is 31 and this may be visible as a bright edge in the displayed image. The reason for such a large variation in grey level at the transition between the grey levels 15 and 16 is that there is a large shift in the mean position of the transmission levels from the end of the frame to the beginning of the frame when this transition takes place. In the case of the grey level 15, the mean position is towards the end of the frame since only the last five time slots have values which are not equal to 0, whereas, in the case of the grey level 16, the mean position is nearer to the beginning of the frame in view of the fact that the last five time slots have the value 0 (in this case the mean position is at time slot 8 within the frame).

Figure 7:
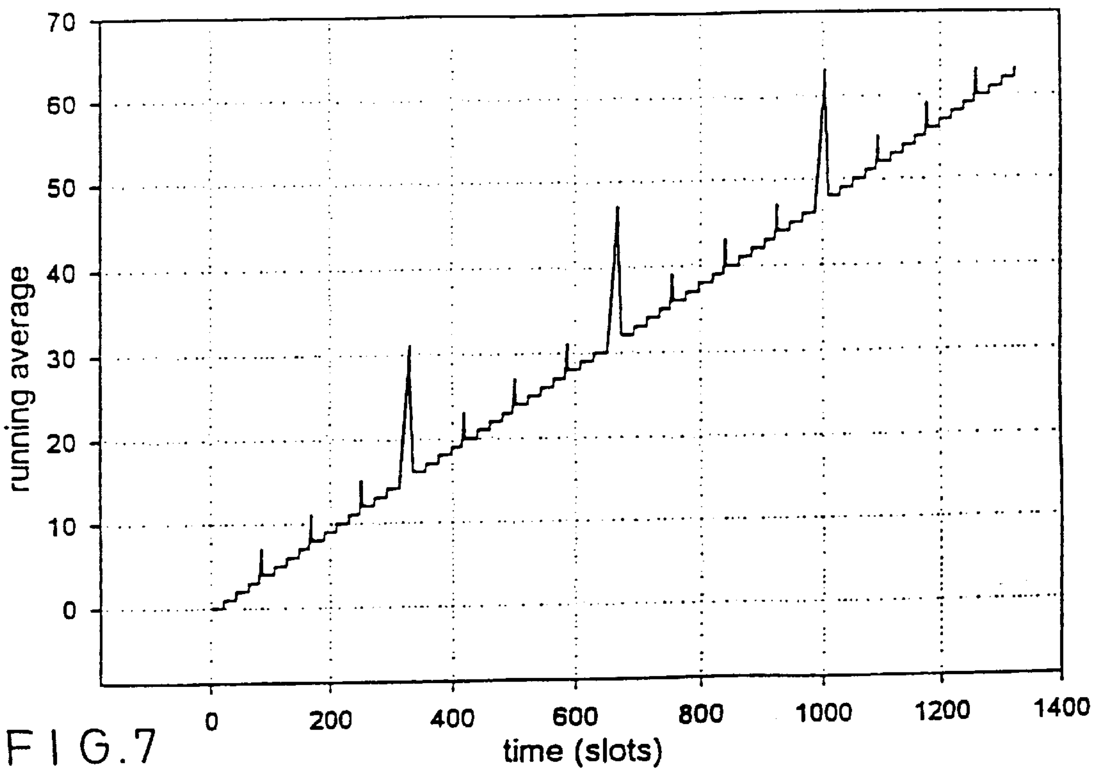
FIG. 7 is a graph of such a running average as a function of time during a scan through all 64 grey levels sequentially using such an addressing arrangement.

FIG. 7 shows the variation in the running average in such an addressing arrangement during scanning through all 64 grey levels 0 to 63 sequentially. As in the case of FIG. 6, the integration period is equal to one frame time corresponding to twenty-one time slots. This figure demonstrates the transient response that would be observed when an image area of smooth grey level gradient from grey level 0 to grey level 63 is moved one pixel along (the grey level increasing by one for each pixel). As expected this figure shows a peak transient response at the transition from grey level 15 to grey level 16, as well as at transitions between other grey levels.

Figure 8:
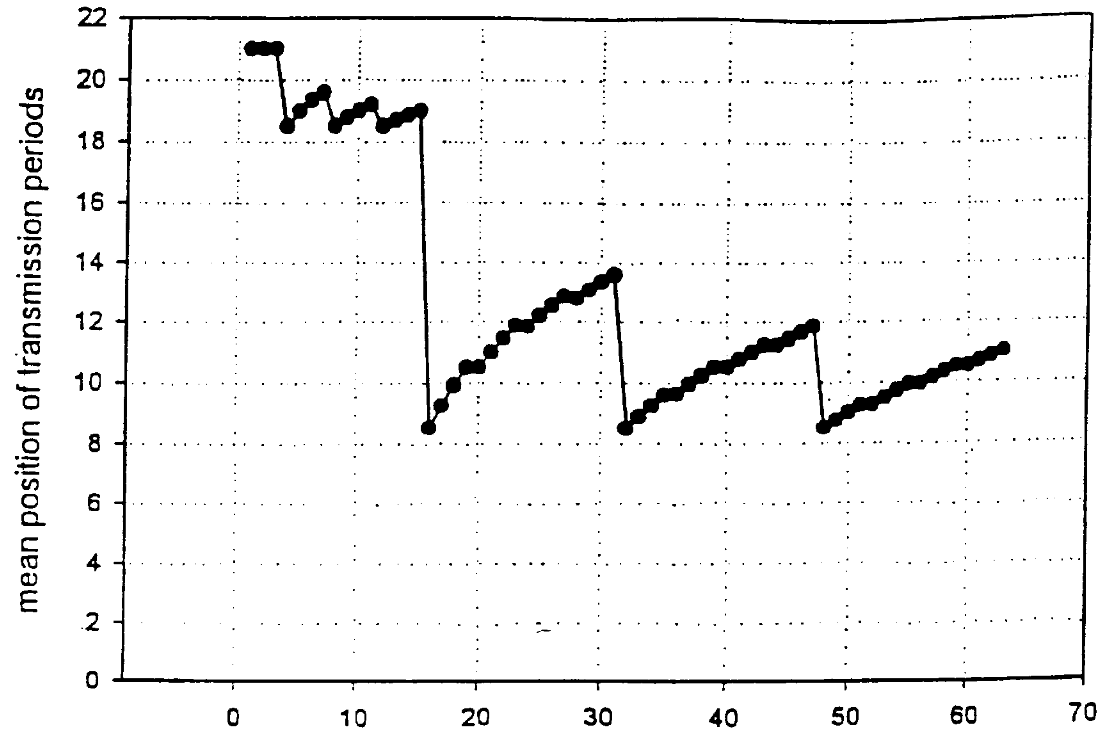
FIG. 8 is a graph of the mean temporal position of the transmission periods within a frame period for each grey level in such an addressing arrangement.

FIG. 8 shows the mean position of the transmission levels of the temporal bits over the frame period as a function of the grey level. This demonstrates, as expected, that the mean position remains in the last time slot up to grey level 3 since these grey levels are determined entirely by the transmission level of the least significant bit. Thereafter the mean position is shifted significantly as the grey level is affected by the transmission level of the next most significant bit. Furthermore a particularly significant shift in the mean position occurs between grey levels 15 and 16 as the grey level becomes dependent on the transmission level of the most significant bit (rather than the transmission level of the most significant bit simply being 0). A comparison of FIG. 8 with FIG. 7 demonstrates that the largest transients at transitions between grey levels occur during the largest jumps in mean position of transmission levels.

A possible technique for reducing the transient response is to reverse the sequences of the temporal bits between adjacent addressing lines so that the transient is in opposite directions in the two lines, that is:

line i: [0000000000000000 3333 3] [1111111111111111 0000 0]

linei+1: [3 3333 0000000000000000] [0 0000 1111111111111111]

However this technique is not perfect and is incompatible with some types of interlacing. In addition, some image movements, such as movements of horizontal edges at the rate of two lines per frame, might not be compensated at all by this technique.

Figure 9:
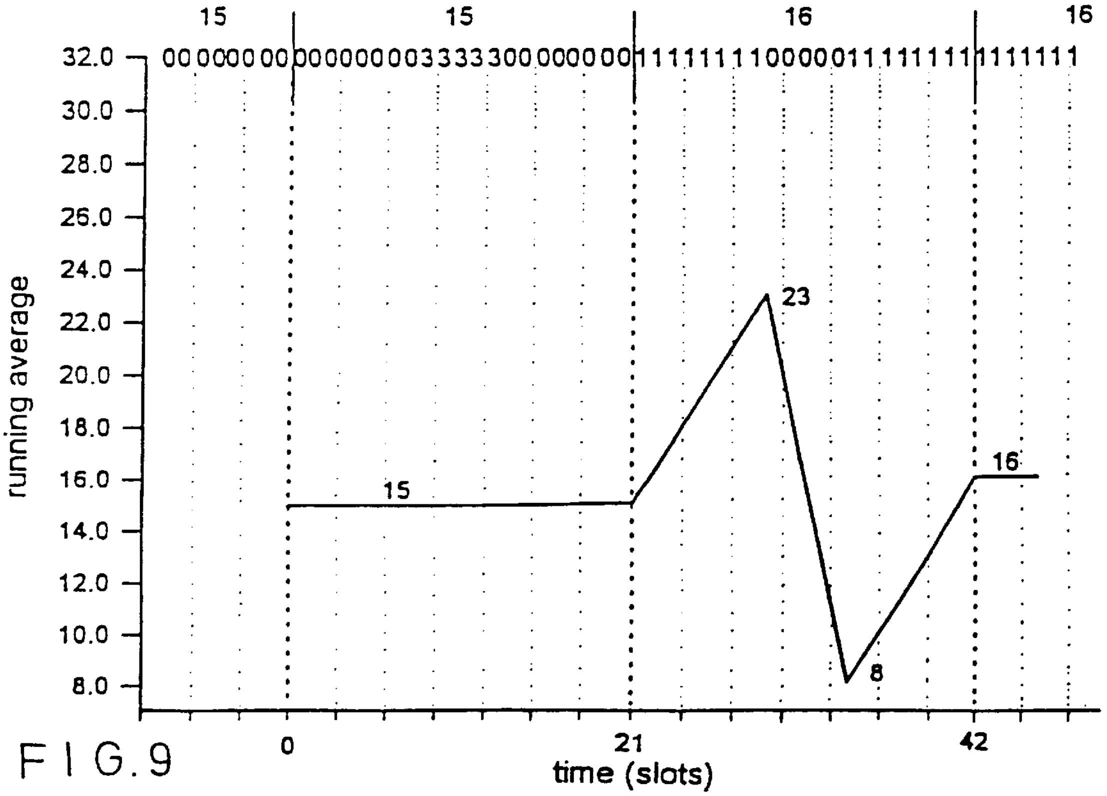
FIG. 9 is a graph, similar to that of FIG. 6, illustrating the running average of the transmission level during a transition from grey level 15 to grey level 16 in a TD 8:4:1:8 SD 1:2 addressing arrangement in which the most significant bit (MSB) is split into two.

Another technique to reduce the transient response is to split the most significant temporal bit into two parts, thereby reducing the shift in the mean position during the transition between grey levels. FIG. 9 is a graph showing the variation in the running average during the transition from the grey level 15 to the grey level 16 but using an addressing arrangement in which the most significant bit is split, that is a TD 8:4:1:8 SD 1:2 addressing arrangement where the two bits represented by 8 are the two parts of the most significant bit. In this case the mean position of the transmission levels is in the center of the frame for both the grey level 15 and the grey level 16. Nevertheless there is a significant increase in the running average to grey level 23 and then a significant drop to grey level 8 during the transition between the grey levels 15 and 16. The reason for this significant transient response is the large change in variance between the grey levels 15 and 16. Thus, whilst splitting of the most significant temporal bit is useful in reducing the peak amplitude of the transient, it has the effect of producing a transient which is bipolar (which may or may not average to give further compensation depending on the image).

Figure 10:
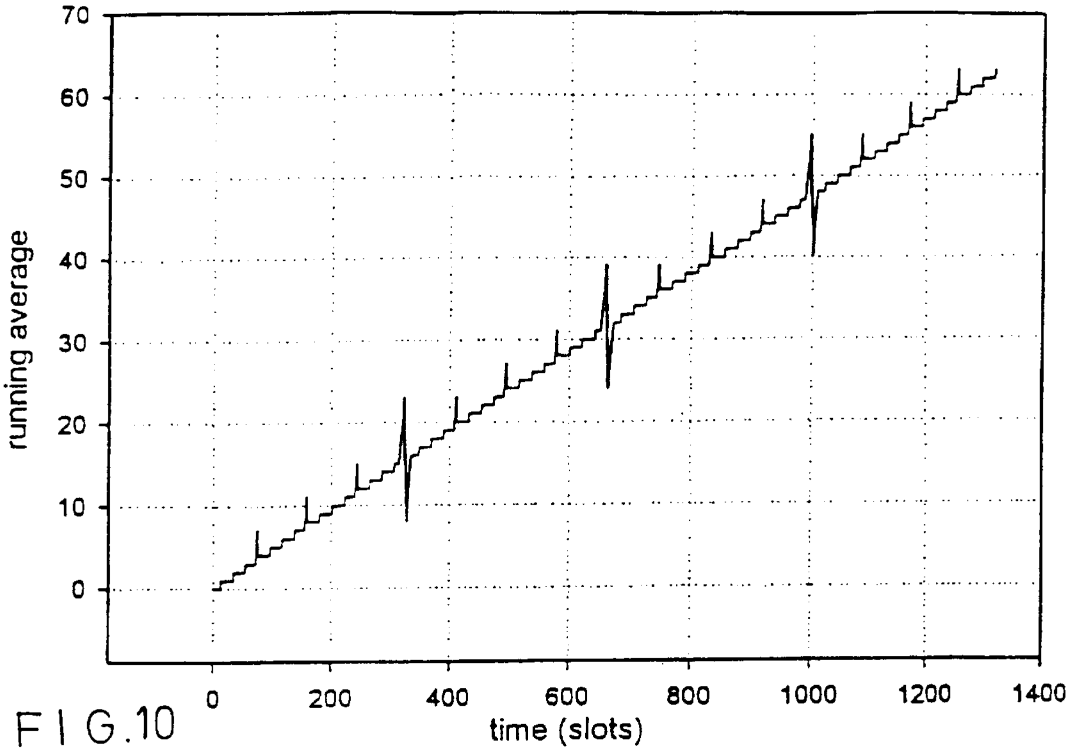
FIGS. 10 and 11 are graphs, similar to those of FIGS. 7 and 8, for such a split MSB addressing arrangement, FIG. 11 additionally showing the variance for each grey level.

FIG. 10 is a graph of the running average during scanning through all 64 grey levels sequentially for such a TD 8:4:1:8 SD 1:2 addressing arrangement where such addressing is controlled by a conventional lookup table only so that both parts of the most significant bit have the same state at any one time. This shows the occurrence of further bipolar transients at transitions other than that between the grey levels 15 and 16.

Figure 11:
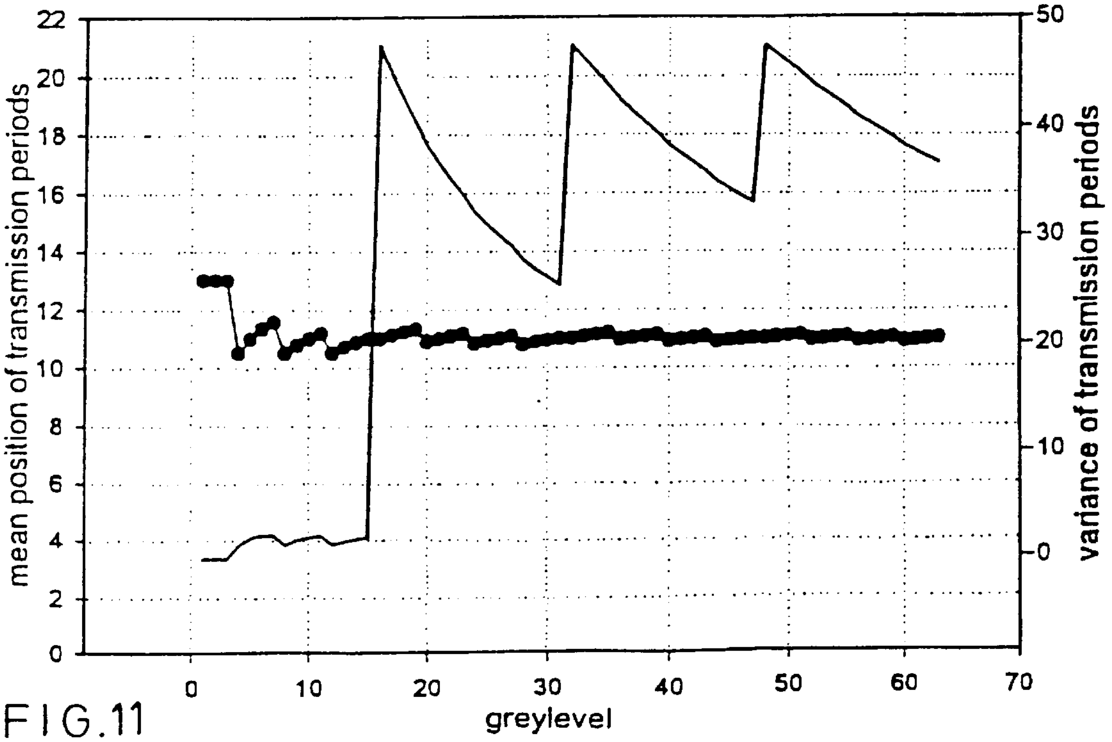

FIG. 11 is a graph showing both the mean position and the variance of the transmission periods for all 64 grey levels in such an addressing arrangement. This shows that the transients in the running average correspond to peaks in the variance, whilst there is little variation in the mean position of the transmission levels over all 64 grey levels.

Figure 12:
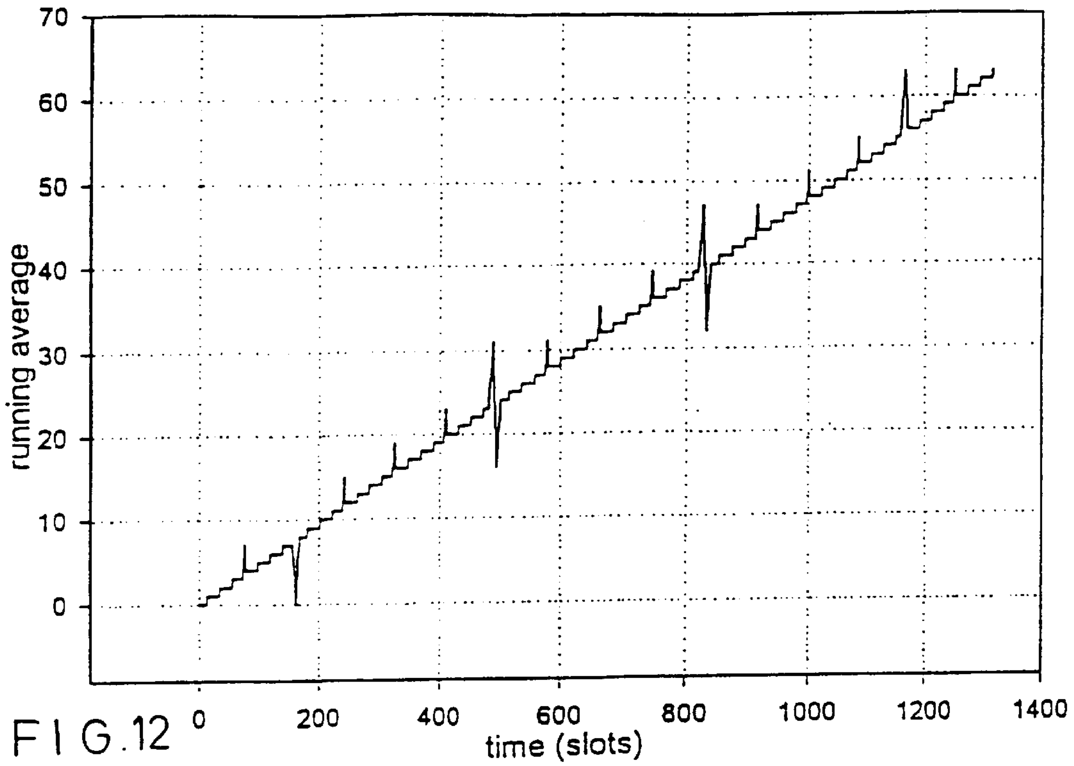
FIGS. 12 and 13 are graphs, similar to those of FIGS. 10 and 11, but for a transition between the grey levels following a different mean path.
Figure 13:
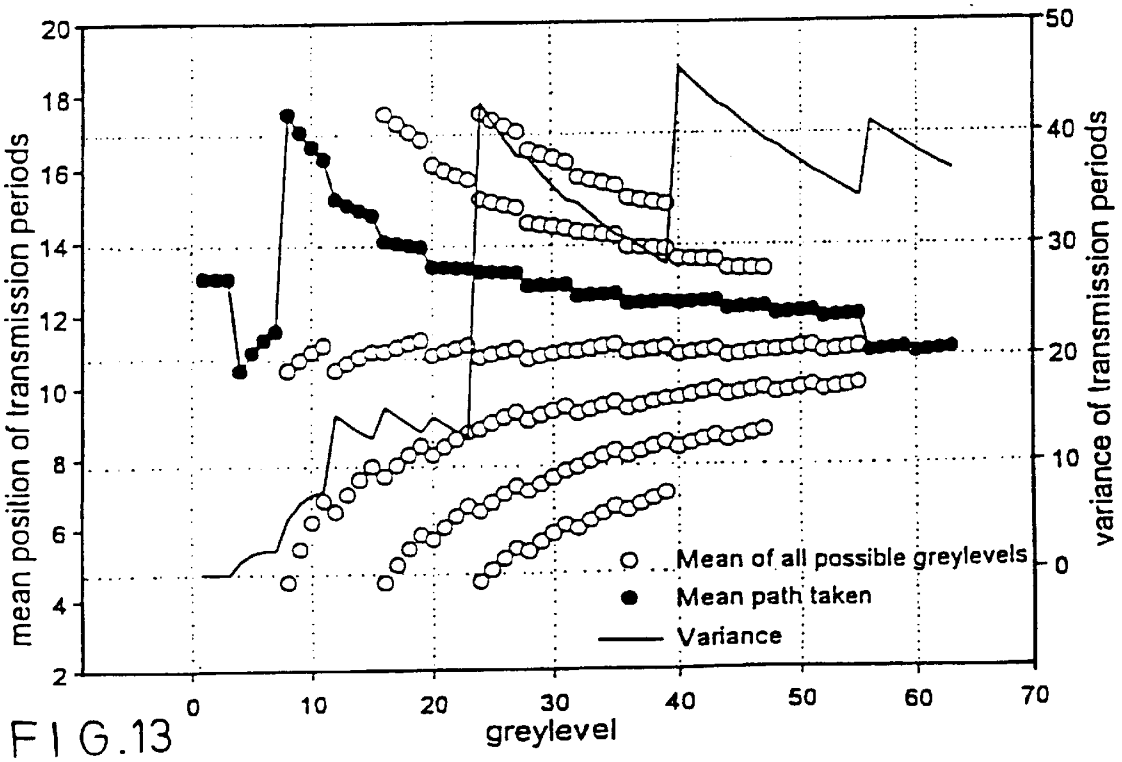

However splitting of the most significant temporal bit allows the introduction of degeneracy, that is the possibility of the same grey level being produced by more than one combination of transmission levels in the different temporal bits, if the two parts of the most significant bit are controllable independently using different lookup tables. FIGS. 12 and 13 are graphs, similar to those of FIGS. 10 and 11, but demonstrating the effect on the transient response of independently controlling the two parts of the most significant bit so that a different mean path is followed at the transitions between grey levels as compared with the case shown in FIG. 11. In FIG. 13 each dot represents the mean of the transmission periods of a particular combination of transmission levels of the temporal bits which may be used to obtain the required overall grey level, the mean path followed being denoted by the dark dots, and the light dots denoting other mean paths which might be followed using different combinations of transmission levels in the temporal bits. Whilst the mean path chosen in this case enables a reduction in the variance difference, and hence the transient response, between the grey levels 15 and 16, this in itself is not particularly helpful as it places the pixel in a state where it is forced to undergo a significant transient response at a transition between other grey levels, as demonstrated by the variance peaks in FIG. 13 and the corresponding large transients in FIG. 12.

Another way to utilize such degeneracy would be to try to find a fixed lookup table which will result in the minimum number and size of pseudo-edge transients. However the sheer number of possible permutations (of the order of $10^{93}$ in the case of such a split MSB addressing arrangement) makes the search for a suitable lookup table very difficult. In the case of the mean path being followed in FIGS. 12 and 13, the first large transient in the transient response occurs at a large jump in the mean position, whereas the next two large transients occur at large variance jumps, but, whilst the last large transient occurs at another large mean jump, the polarity of this transient is opposite to that of the first large transient (which also corresponds to an opposite direction of mean jump). At any transition where the transient is caused by a variance jump the polarity is always the same. However, as there are several mean paths which can be followed, jumps of either polarity can be taken. In this manner virtually symmetric paths (about the center frame mean position) can be obtained by following either the maximum or the minimum mean path in dependence on the grey level such that all the large transients are caused by mean jumps. Furthermore, if two neighboring pixels were to be addressed such that the pixels followed opposite mean paths in accordance with the invention, then some compensation would be obtained.

Figure 14:
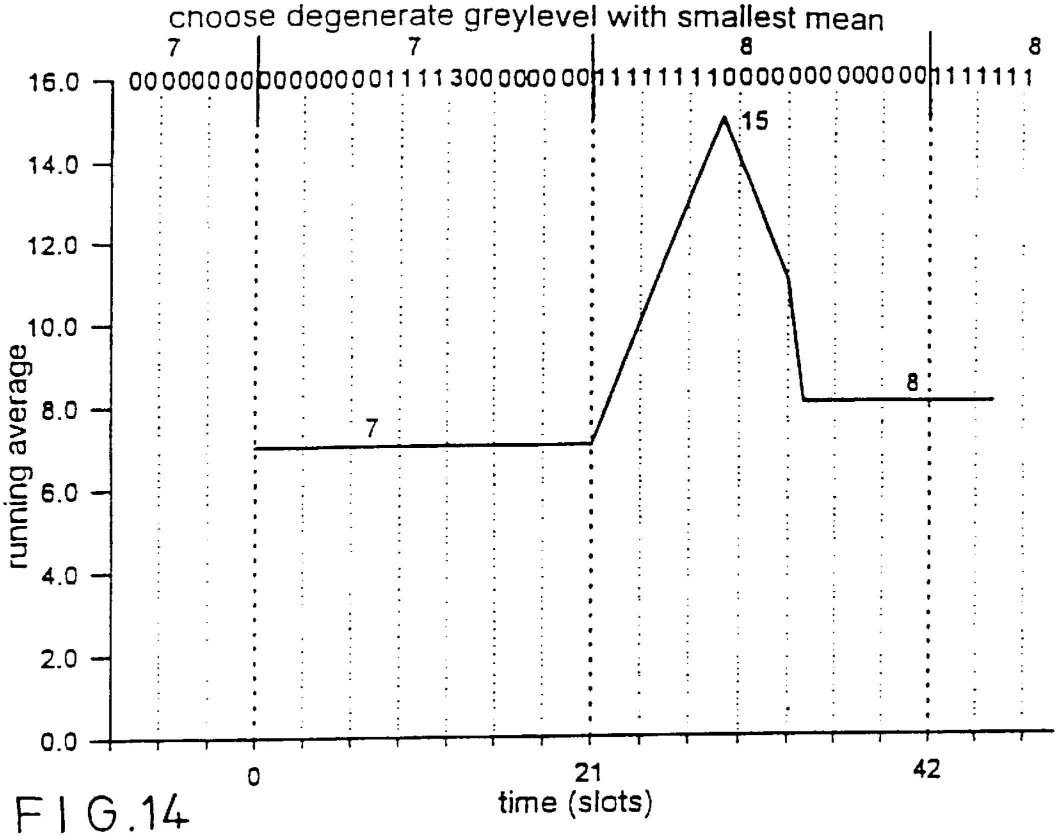
FIGS. 14 and 15 are graphs, similar to those of FIGS. 6 and 9, showing the running average during a transition from the grey level 7 to the grey level 8 for the split MSB addressing arrangement following two different mean paths.
Figure 15:
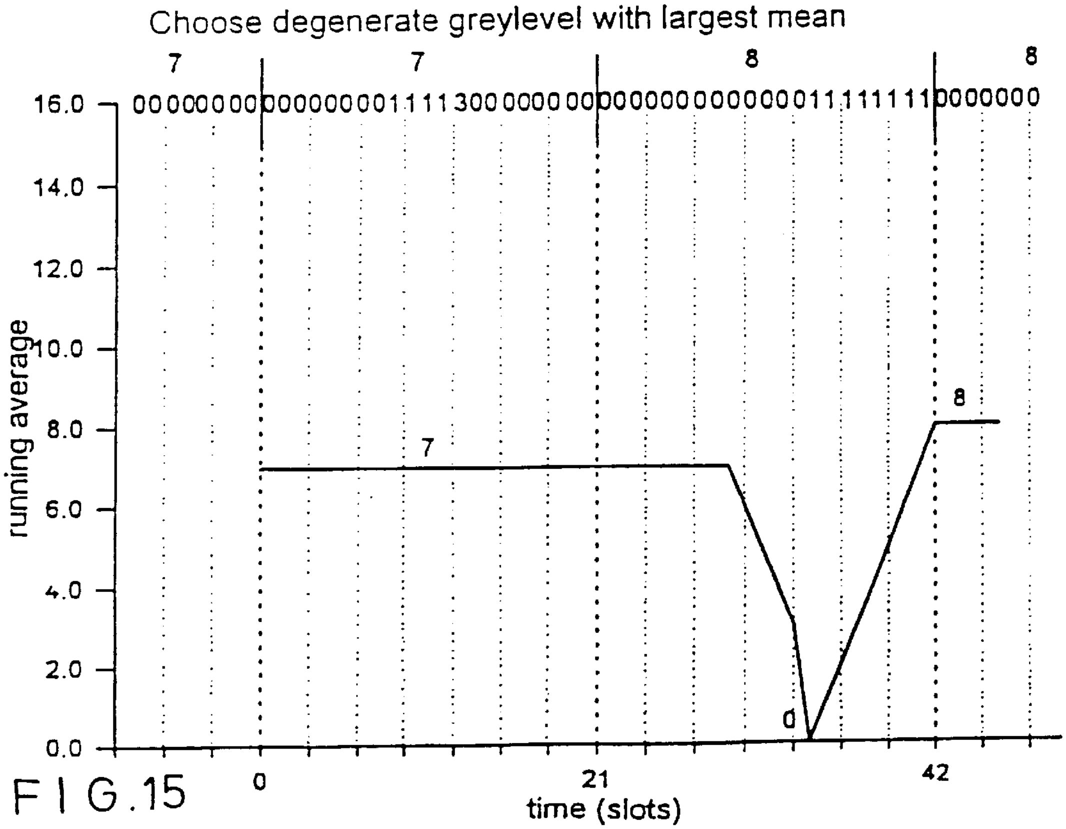

In order to illustrate this point, a transition from a second transmission level, that is grey level 7, to a first transmission level, that is grey level 8, in such a split MSB TD 8:4:1:8 SD 1:2 addressing arrangement can be considered, as shown in FIG. 14, in which the grey level 7 (the second transmission level) is represented by level 0 in the two parts of the most significant bit, level 1 in the next most significant bit, and level 3 in the least significant bit, and grey level 8 (the first transmission level) is represented by a first combination of temporal dither signals, that is by level 1 in the first half of the most significant bit and level 0 in the second half of the most significant bit and in the next most significant and least significant bits. This first combination corresponds to the choice of the combination of transmission levels in the bits for obtaining the grey level 8 which gives the lowest possible mean position for the bits, and produces a transient response in which the running average increases to 15 before falling to the required level 8 just over half way through the frame. By contrast FIG. 15 shows the transient response at the transition between the grey level 7 (the second transmission level) and the grey level 8 (the first transmission level) where the transmission levels of the bits chosen to obtain the grey level 8 correspond to a second combination of temporal dither signals, differing from the first combination and are such as to give the highest possible mean position. In this second combination the second half of the most significant bit is at level 1 whereas the first half of the most significant bit and the next most significant and least significant bits are all at level 0. This results in a transient response in which the running average begins to fall approximately half the way through the frame and after falling to level 0, then increases to the required level 8 at the end of the frame.

Figure 16:
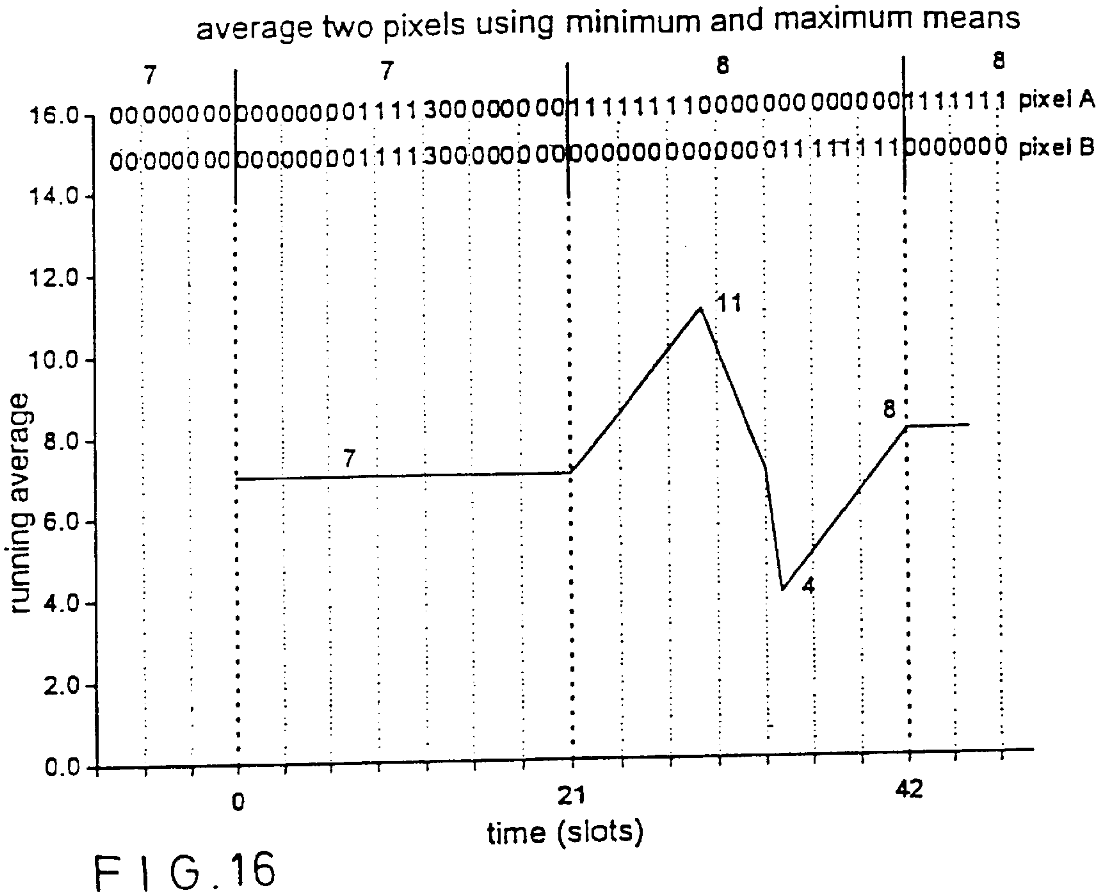
FIG. 16 is a graph showing the average of the graphs of FIGS. 14 and 15.

If two neighboring pixels A and B, constituting first and second modulating elements, are controlled so as to follow two opposite paths in the transition from grey level 7 (the second transmission level) to grey level 8 (the first transmission level) in accordance with a first embodiment of the invention, so as to respectively exhibit transient responses as shown in FIGS. 14 and 15, this would not provide the perfect compensation as the two transients do not perfectly overlap. Nevertheless, as shown in FIG. 16, such a combination of mean paths in neighboring pixels can provide a resultant response in which the peak-to-peak amplitude of the transient is effectively halved.

Figure 17:
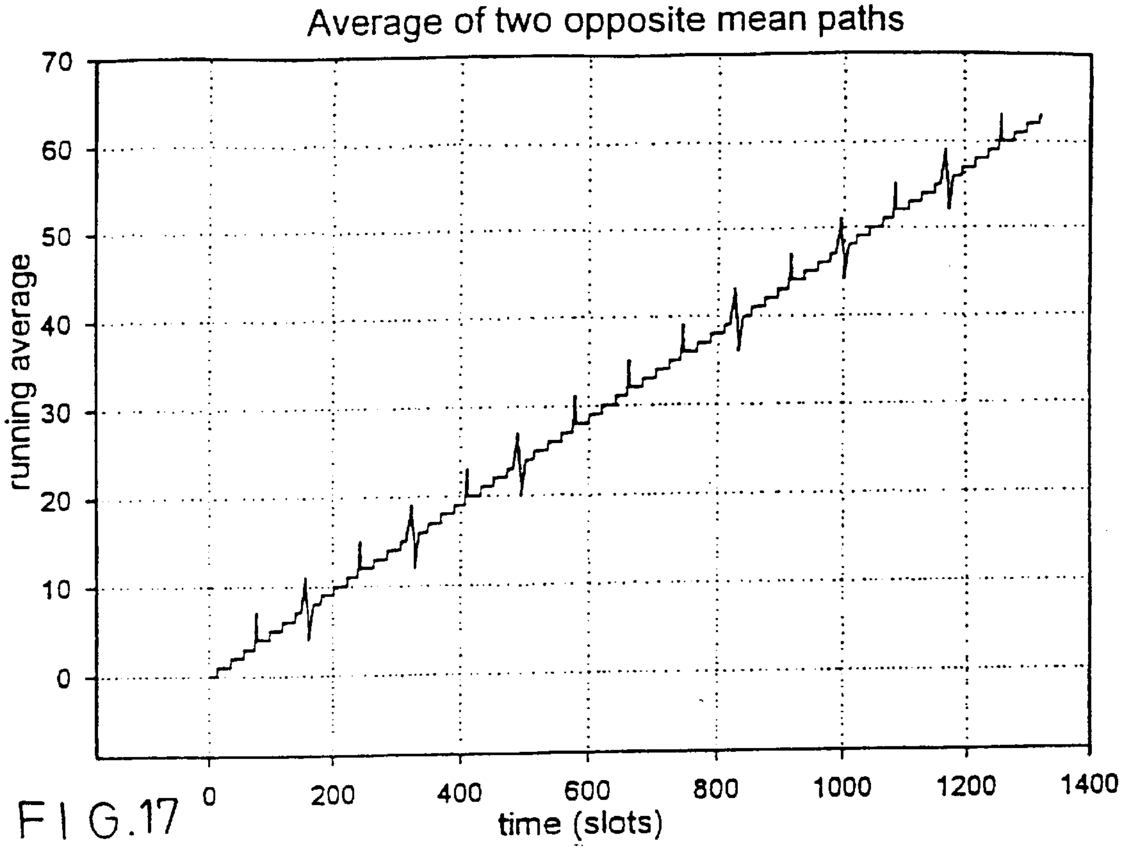
FIGS. 17 and 18 are graphs, similar to those of FIGS. 12 and 13, but showing the average transmission level of two pixels following opposite mean paths during a scan through all 64 grey levels sequentially for a split MSB addressing arrangement in accordance with a first embodiment of the invention.
Figure 18:
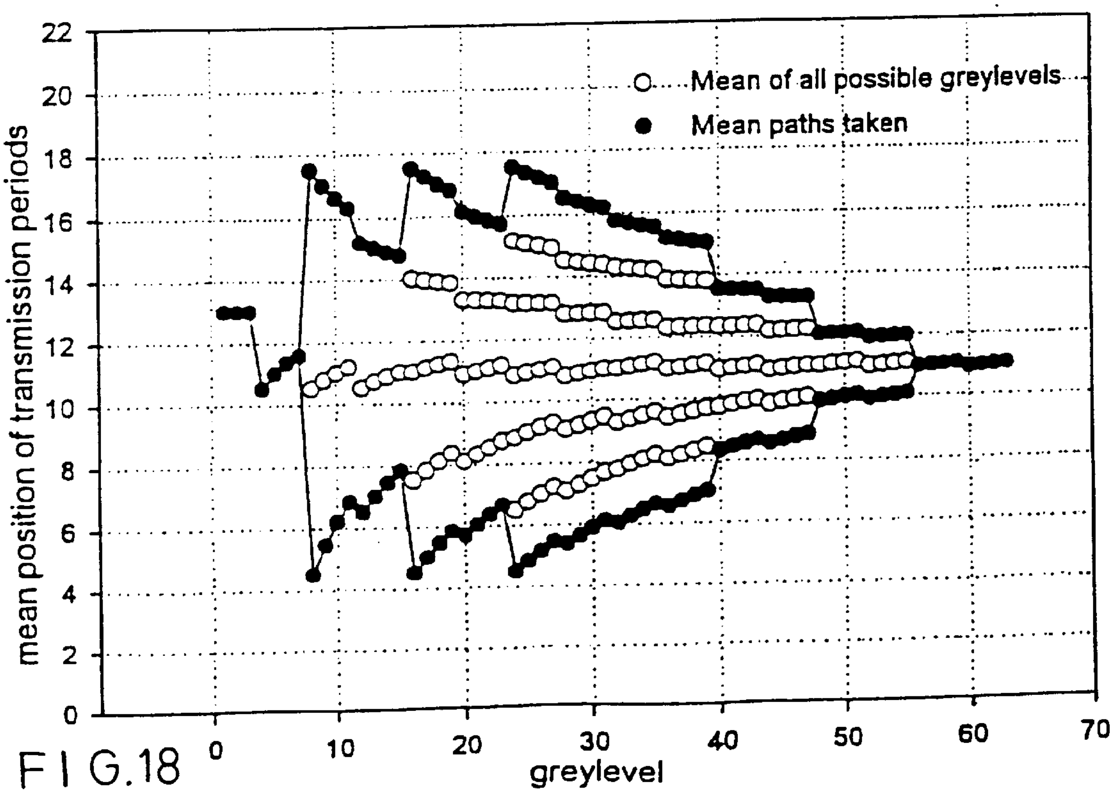

FIG. 17 shows the running average of two neighboring pixels A and B following opposite mean paths in accordance with the first embodiment of the invention as scanning takes place sequentially through all 64 grey levels. The mean paths followed by the two pixels in this case are shown in FIG. 18, and it will be appreciated that, at each transition where a transient of one polarity is caused by a large mean jump in one pixel, a transient of opposite polarity is caused by an opposite mean jump in the neighboring pixel. Because these transients are offset in phase relative to one another, this results in a bipolar transient being obtained in each case. However this transient is of reduced amplitude as compared with the corresponding transients shown in FIG. 7 for a conventional TD 16:4:1 SD 1:2 addressing arrangement, or as shown in FIG. 10 for a split MSB TD 8:4:1:8 SD 1:2 addressing arrangement using only a conventional lookup table.

In accordance with the first embodiment of the invention, such a split MSB TD 8:4:1:8 SD 1:2 addressing arrangement in which neighboring pixels follow opposite mean paths can be implemented by utilizing the lookup tables of FIGS. 19*a* and 19*b* respectively to control the transmission levels of the spatial and temporal bits of the two pixels. For example, Lookup Table 1 may control the pixels along one column, whereas Lookup Table 2 may control the pixels along an adjacent column with the lookup tables alternating from column to column. Alternatively, Lookup Table 1 may control the pixels along one row and Lookup Table 2 may control the pixels along an adjacent row with the lookup tables alternating from row to row. A further possibility is that the pixels are controlled by the Lookup Tables 1 and 2 such that the lookup tables alternate both from row to row and from column to column. The pseudo-edge phenomenon is most noticeable in areas in which the grey level is changing smoothly which is also when there is a higher probability that neighboring pixels will go through similar grey level transitions. Thus, this averaging technique will be most effective for the worst cases of the pseudo-edge phenomenon.

Figure 20A:
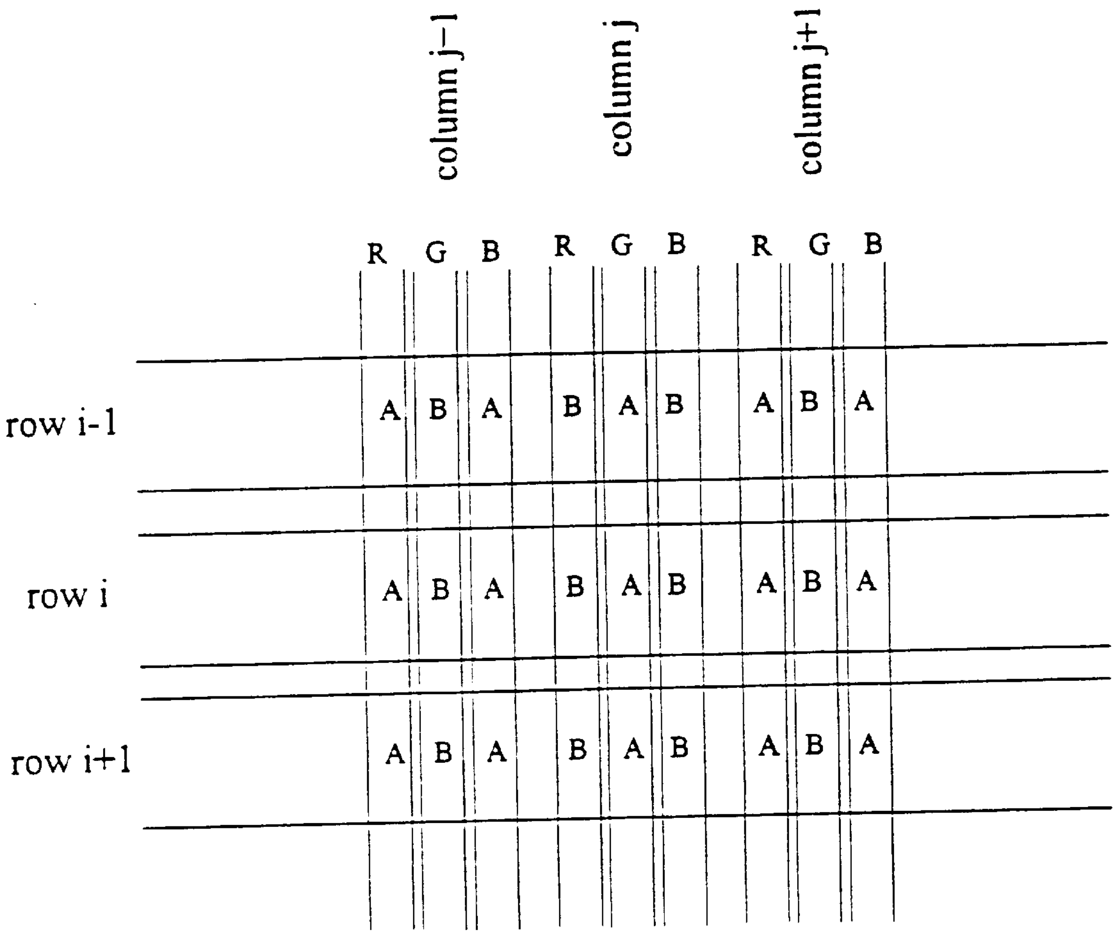
FIGS. 20*a* and 20*b* diagrammatically show two possible addressing arrangements which may be used in such an embodiment.

Further possible control arrangements may be contemplated, for controlling the red, green and blue sub-pixels R, G and B of a color display, for example. FIG. 20*a* diagrammatically shows the pixels at the intersections of three rows i−1, i and i+1 and three columns j−1, j and j+1 in such a color display where each pixel is divided along the rows into three color sub-pixels R, G and B. In this case the sub-pixels are controlled alternately along the rows by the Lookup Tables 1 and 2, as denoted by the letters A and B applied to the sub-pixels. In a further possible, non-illustrated arrangement, the sub-pixels are controlled randomly by the Lookup Tables 1 and 2, that is so that A and B occur in a less regular fashion along the rows, rather than alternately as in FIG. 20*a*.

Figure 20B:
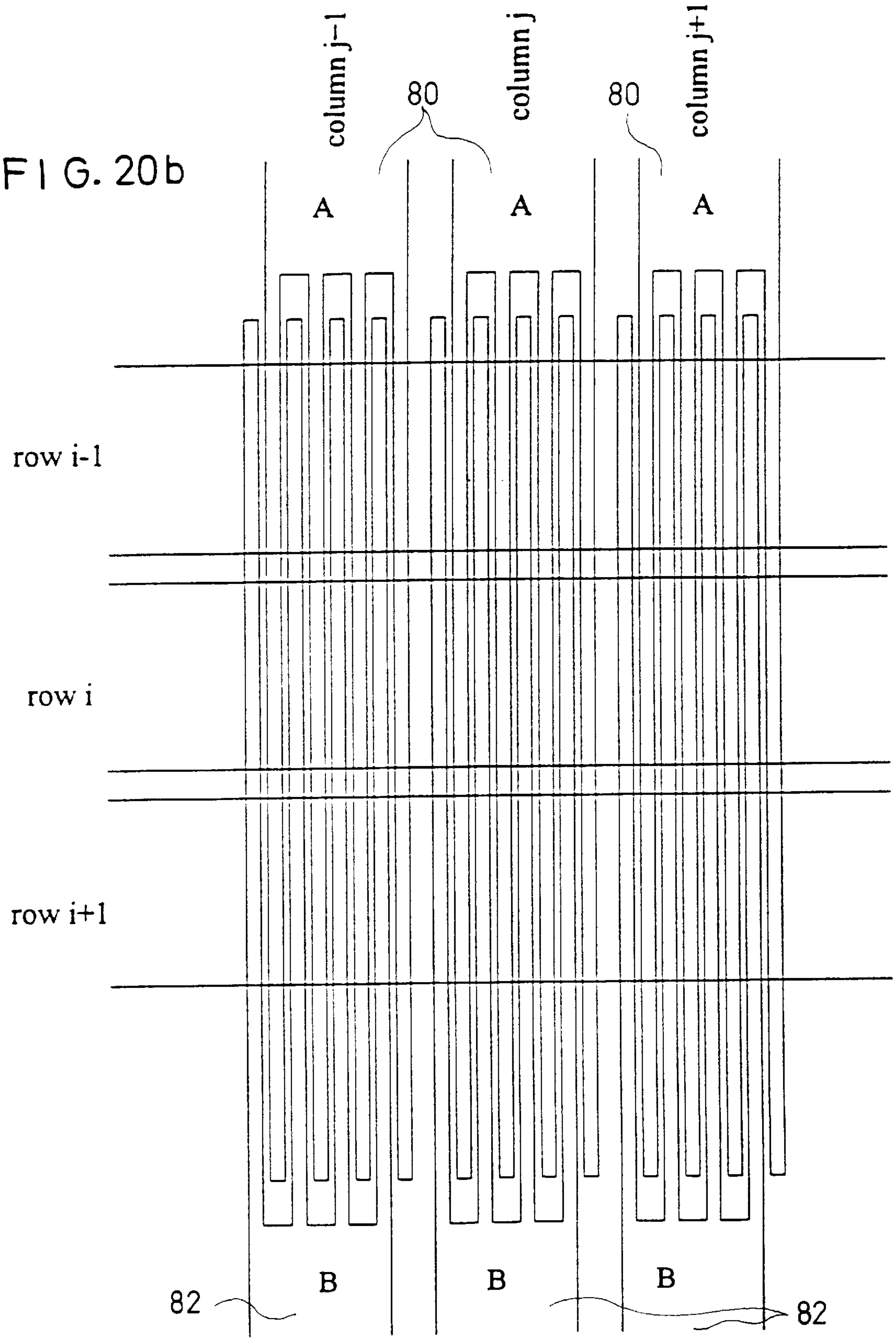

In a still further arrangement, shown diagrammatically in FIG. 20*b*, each pixel is controlled by interleaved stripe electrodes 80 and 82 controlled by Lookup Tables 1 and 2 respectively so that, considering each pixel in the direction of the rows, the pixel is driven alternately by Lookup Tables 1 and 2. The embodiments of FIGS. 20*a* and 20*b* have the effect of improving the resolution and therefore the spatial averaging.

It is also possible for the addressing arrangement to be such that the different lookup tables are only used in regions in which a transition would otherwise produce a correspondingly large transient. In other regions the same lookup table would be used for all pixels. Such an addressing arrangement utilizes image processing to determine when and where the undesirable transitions would occur. This would have the advantage of reducing eye tracking artifacts.

Figure 21:
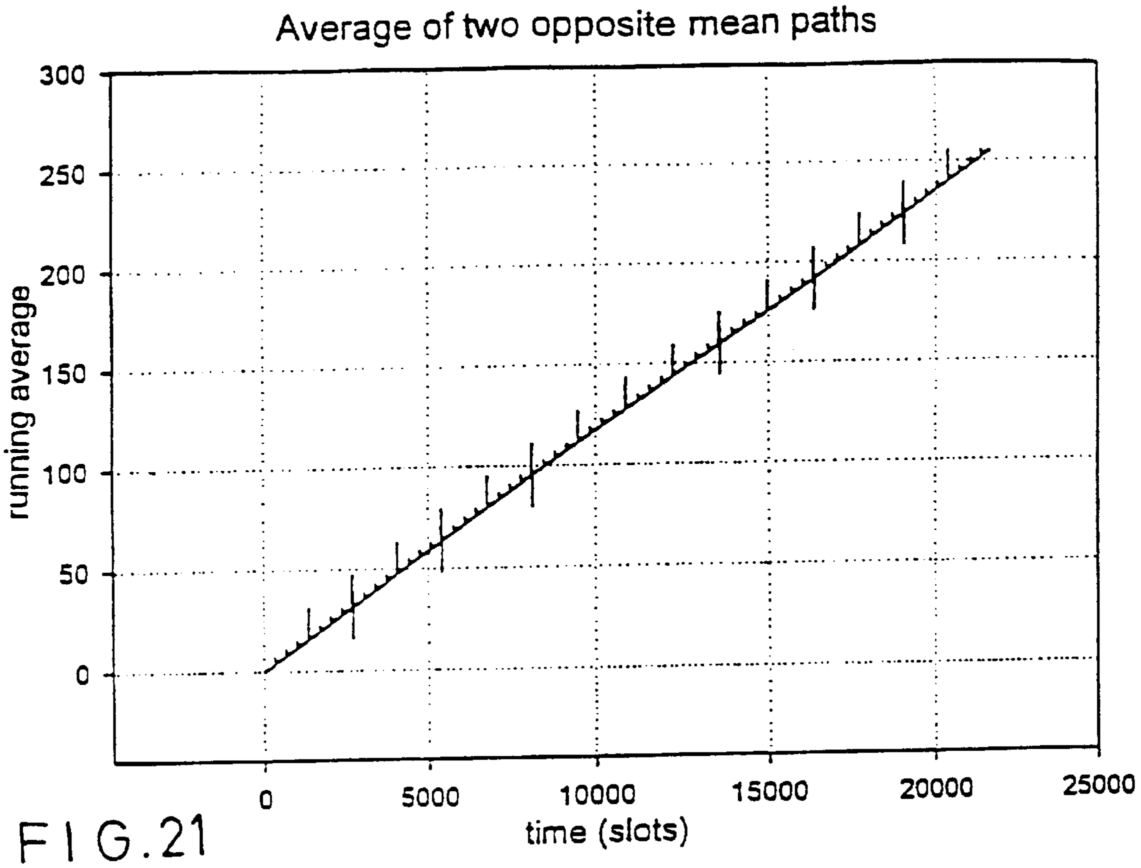
FIGS. 21 and 22 are graphs similar to those of FIGS. 17 and 18, showing the average transmission level of two pixels following opposite mean paths during a scan through all 256 grey levels sequentially for a split MSB TD 32:16:4:1:32 SD 1:2 addressing arrangement in accordance with a second embodiment of the invention.
Figure 22:
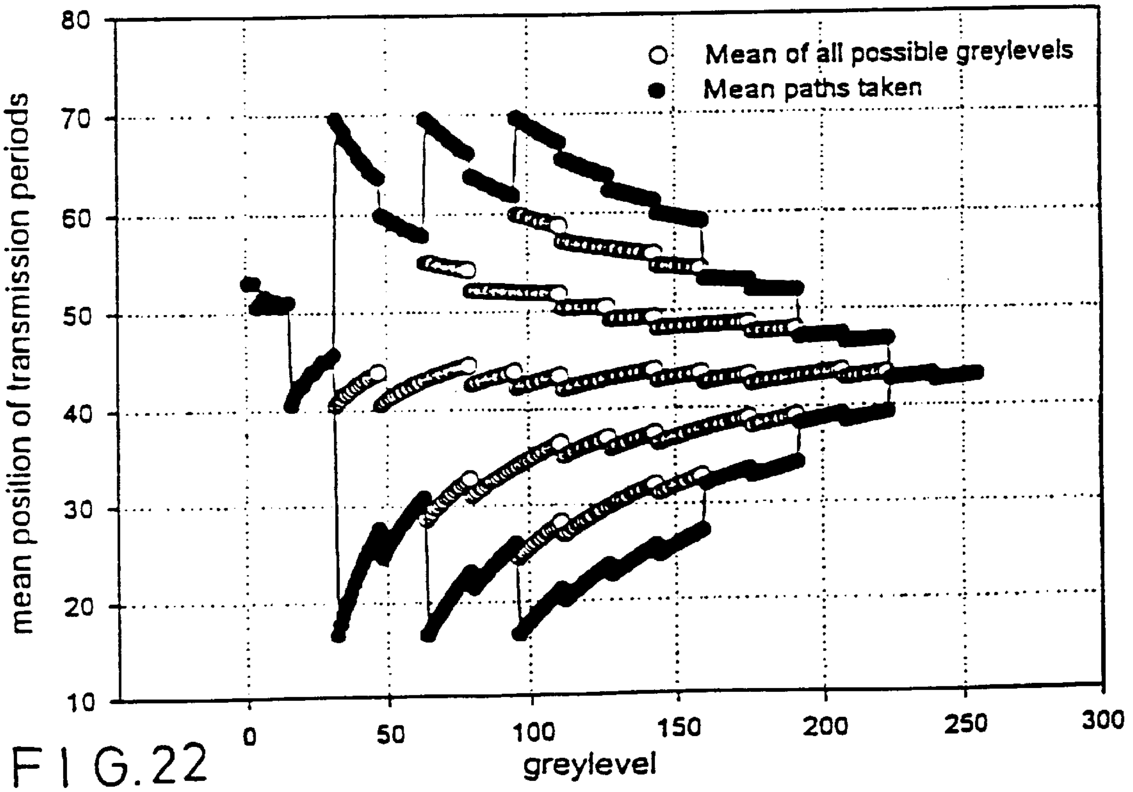

The invention is also applicable to other types of addressing arrangement utilizing TD and SD, or even to addressing arrangements using TD only. For example a considerable improvement in the transient response as compared with that of a conventional TD 64:16:4:1 SD 1:2 addressing arrangement is obtained in accordance with a second embodiment of the invention by addressing neighboring pixels of a split MSB TD 32:16:4:1:32, SD 1:2 addressing arrangement such that the pixels follow opposite mean paths. The transient response and the mean paths followed in such an addressing arrangement are shown in FIGS. 21 and 22 which demonstrate a similar pattern of response to FIGS. 17 and 18 showing the response obtained in the first embodiment. FIGS. 25*a*, 25*b* and 25*c* together show a Lookup Table 1 which may be used to control one of the pixels in the second embodiment, whereas FIGS. 26*a*, 26*b* and 26*c* together show a Lookup Table 2 which may be used to control the other pixel in the second embodiment. It will be appreciated that, in this case, 256 non-degenerate grey levels are obtained.

Figure 23:
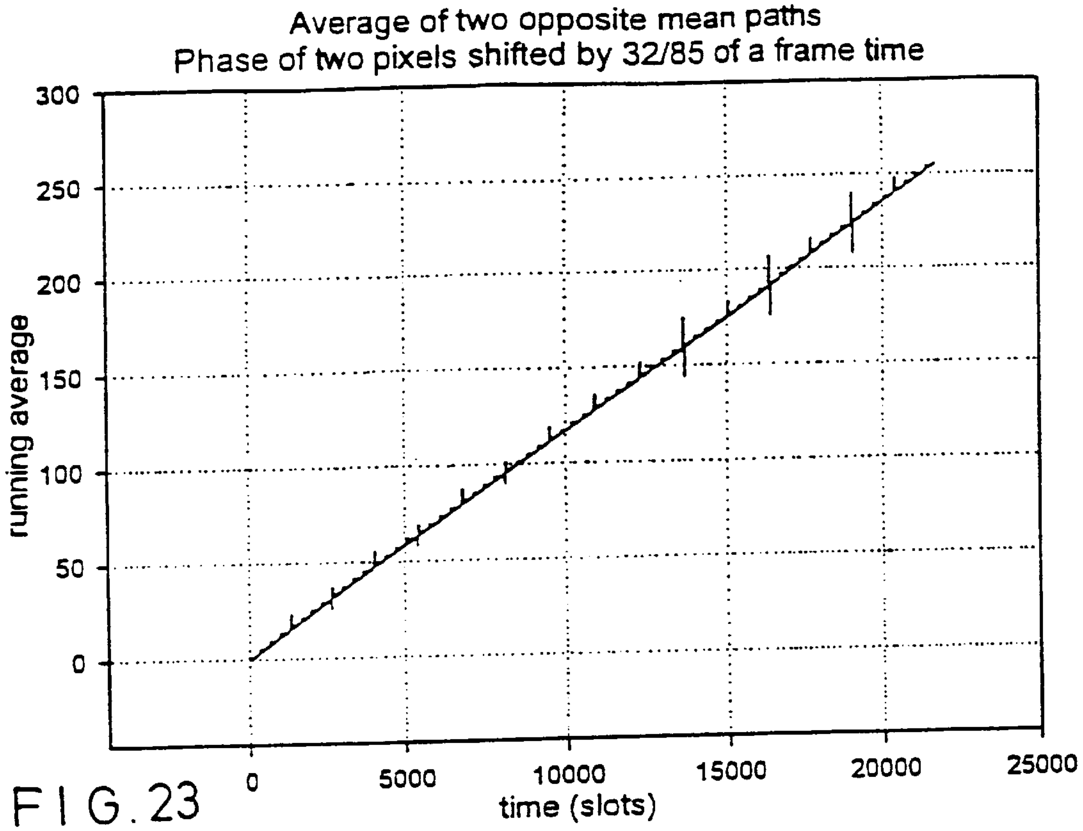
FIGS. 23 and 24 show graphs, similar to that of FIG. 21, but where the phase with which one of the pixels is addressed is shifted by 32/85 of a frame period with respect to the addressing of the other pixel, the two pixels following opposite mean paths in the case of FIG. 23 but following the same path in the case of FIG. 24.
Figure 24:
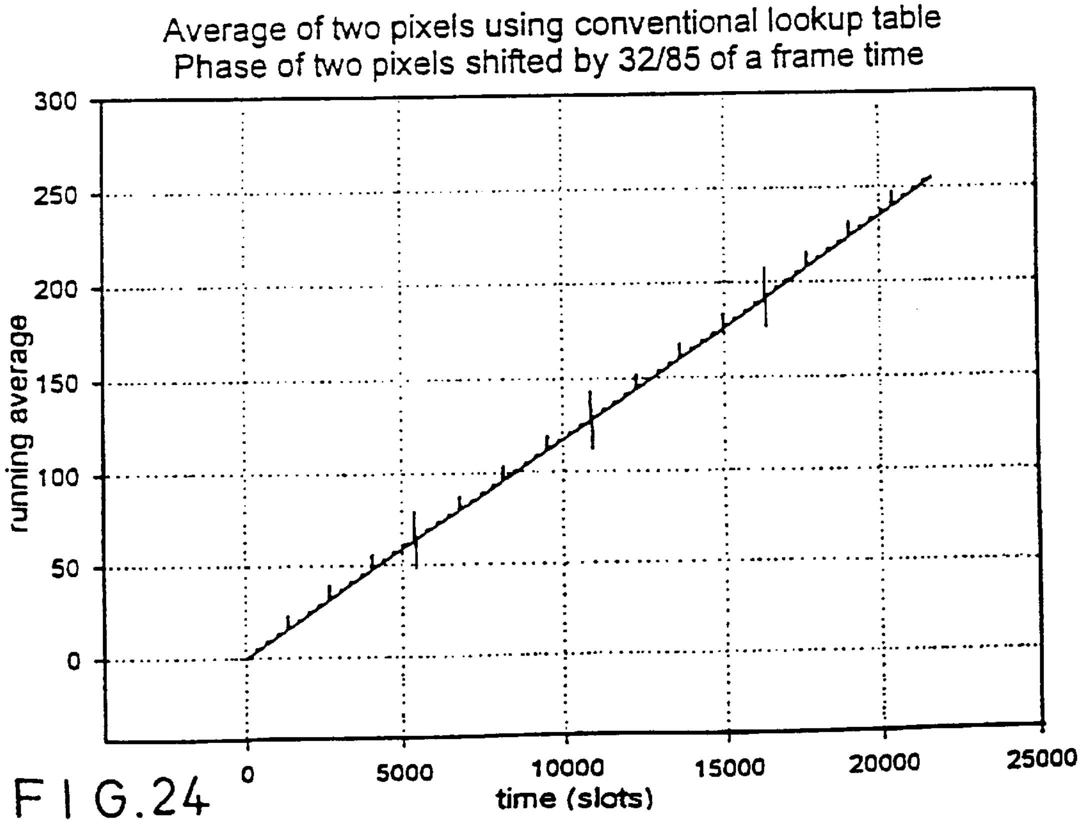

Although large transients in opposite directions are produced by the use of these two lookup tables, the compensation is not perfect due to the difference in time at which the transients occur within the intermediate frame. The overall response may be improved by phase shifting the application of one lookup table to one pixel with respect to the application of the other lookup table to the other pixel. For example, if the phase shift between the two pixels is 32/85 of the frame period, a response is obtained as shown in FIG. 23 in which the compensation is significantly improved for half of the transients by virtue of the fact that the transient corresponding to the transition of one pixel between two adjacent grey levels is almost exactly offset by the transient corresponding to the transition of the other pixel between the two grey levels. This causes the lower three large transients to be significantly reduced although the other three large transients remain unchanged in size so that six large transients have effectively been replaced by three large transients. For the purposes of comparison, FIG. 24 shows the response obtained where such a phase shift is applied using only a single lookup table to control both halves of the most significant bit. Whilst the amplitude of the transients is the same in both FIGS. 23 and 24, the transients occur at lower transmission levels in FIG. 24 and will therefore be more noticeable.

The provision of the phase shift between the two pixels does not compensate all six large transients in the case illustrated in FIGS. 21 and 22 because both the minimum mean path and the maximum mean path contain both positive and negative mean jumps. Negative mean jumps cause the transient to occur at the beginning of the frame whilst positive mean jumps cause the transient to occur at the end of the frame. If each lookup table contains both positive and negative mean jumps then it is not possible to shift the phase to cause overlap of all the transients. However, if the mean paths are chosen such that one lookup table has a majority of positive mean jumps and the other lookup table has a majority of negative mean jumps, then it is possible for more transients to be compensated. One way in which this can be achieved is by swapping the paths followed by the two pixels before the large mean jumps change sign.

Figure 27:
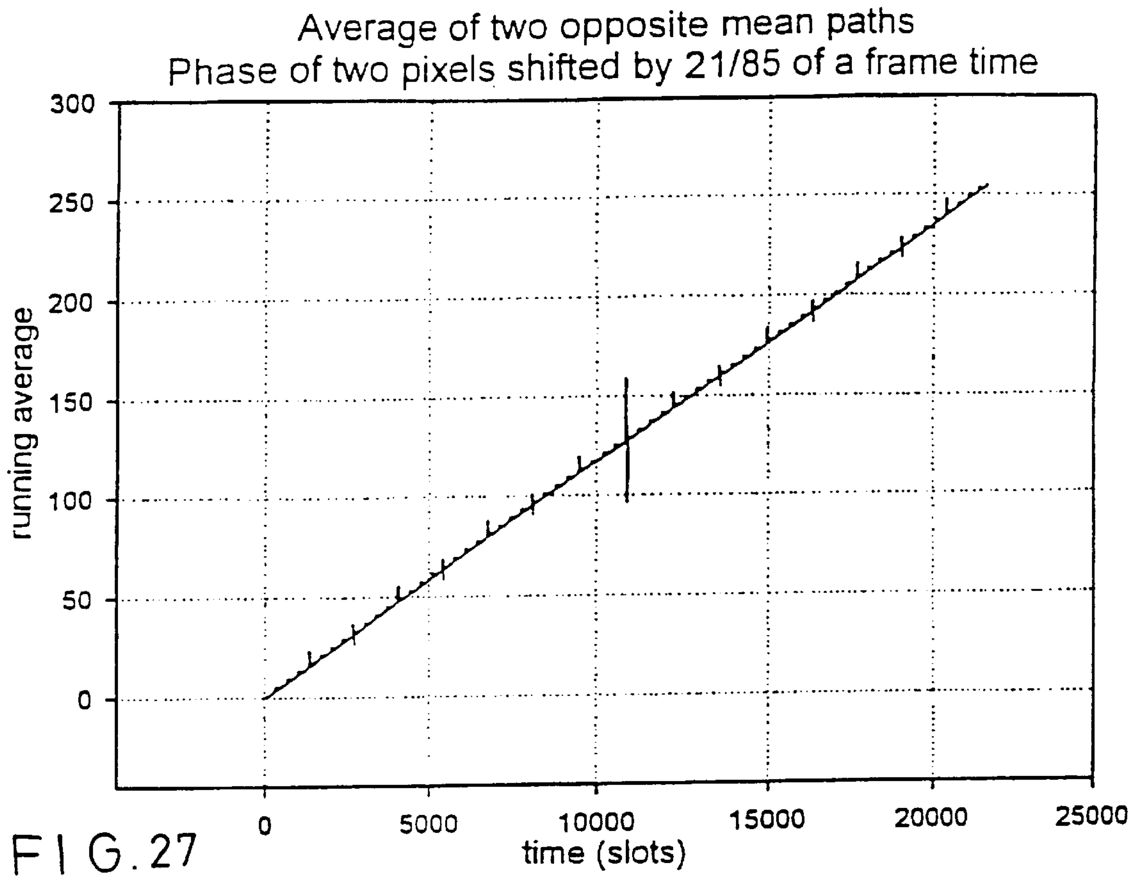
FIGS. 27 and 28 are graphs, similar to those of FIGS. 22 and 23, but where the mean paths followed by the two pixels are interchanged at the transition from grey level 127 to grey level 128.
Figure 28:
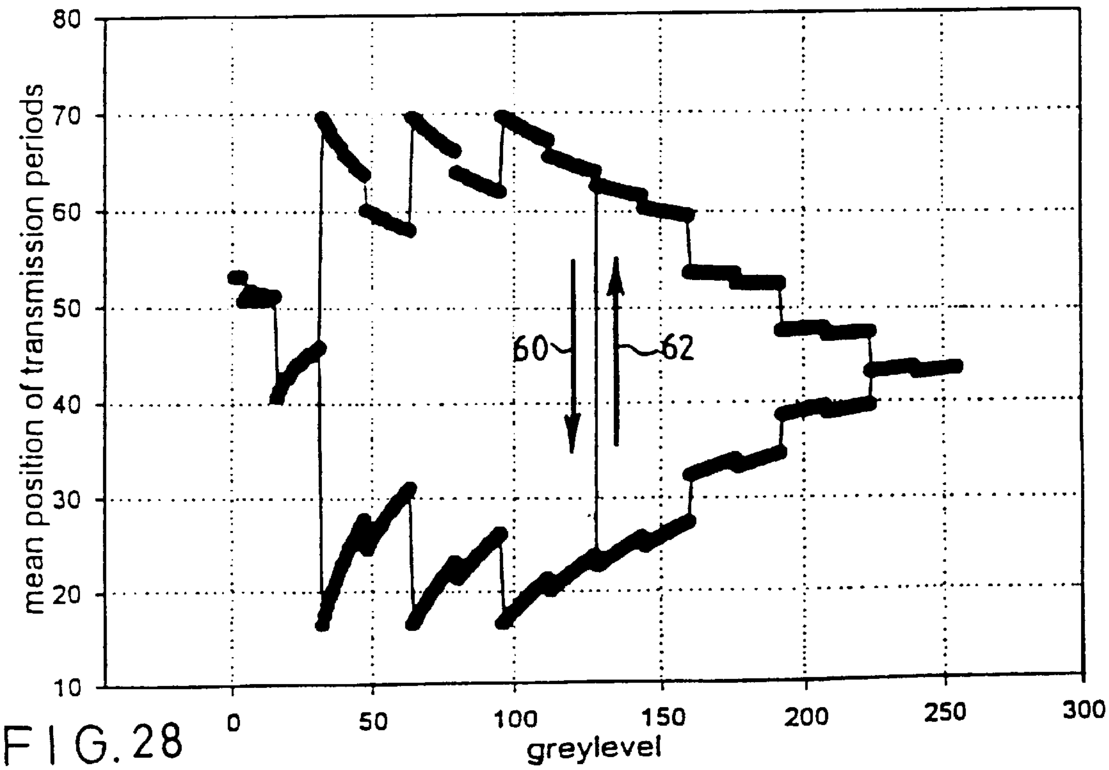

FIGS. 27 and 28 show the transient response and mean paths followed in the case of such a split MSB TD 32:16:4:1:32 SD 1:2 addressing arrangement having a phase shift of 21/85 of a frame period between addressing of the two pixels where the mean path followed by the two pixels changes at the transition between the grey levels 127 and 128, so that the pixel previously following the maximum mean path changes to follow the minimum mean path and the pixel previously following the minimum mean path changes to follow the maximum mean path. Such changes at the transition between the grey levels 127 and 128 are denoted by arrows 60 and 62 in FIG. 28. This leaves one large transient in the transient response of FIG. 27 corresponding to one large mean jump which cannot be compensated by such a technique. The size of the transient is similar to that of the transients obtained by a conventional split MSB addressing arrangement in which the two halves of the most significant bit are controlled by use of a single lookup table. Nevertheless a significant improvement is obtained by virtue of the fact that only one such transient is produced in this case.

Figure 29:
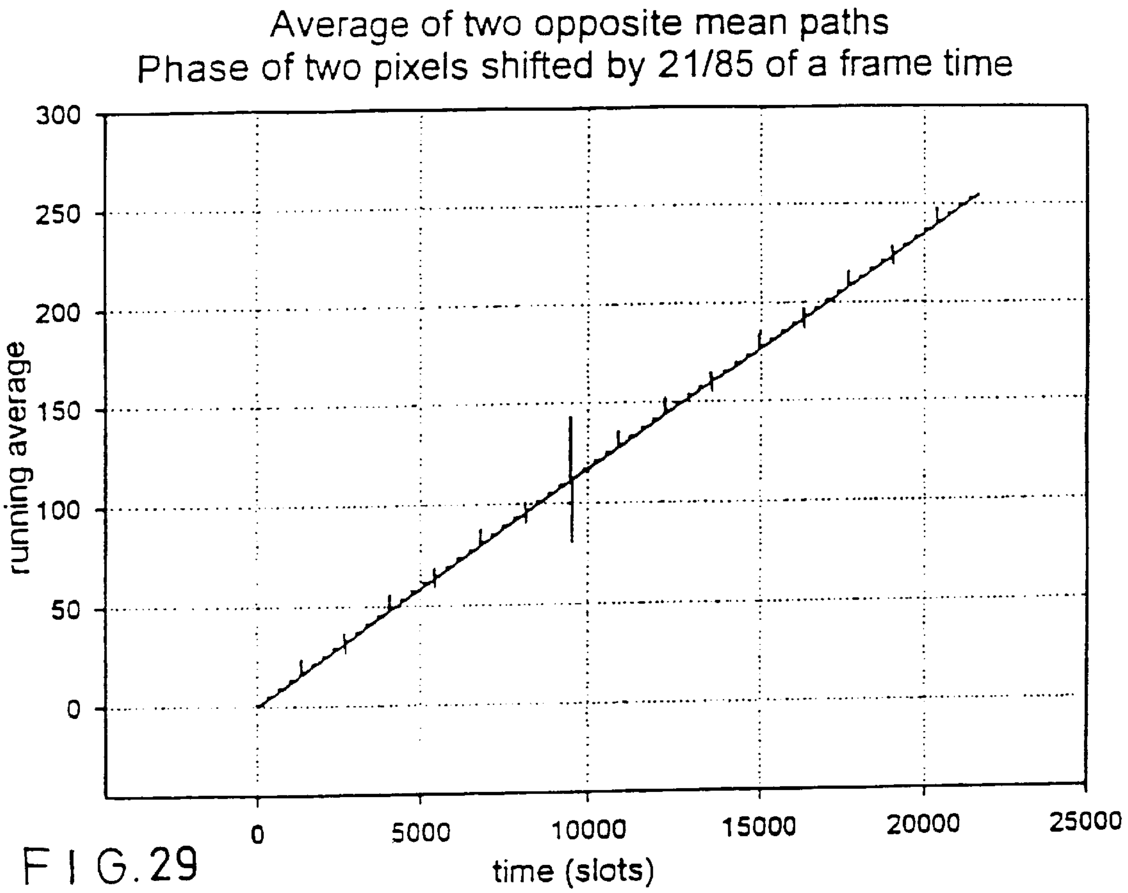
FIGS. 29 and 30 are graphs, similar to those of FIGS. 22 and 23, but where the mean paths followed by the two pixels are interchanged during the transition from grey level 111 to grey level 112.
Figure 30:
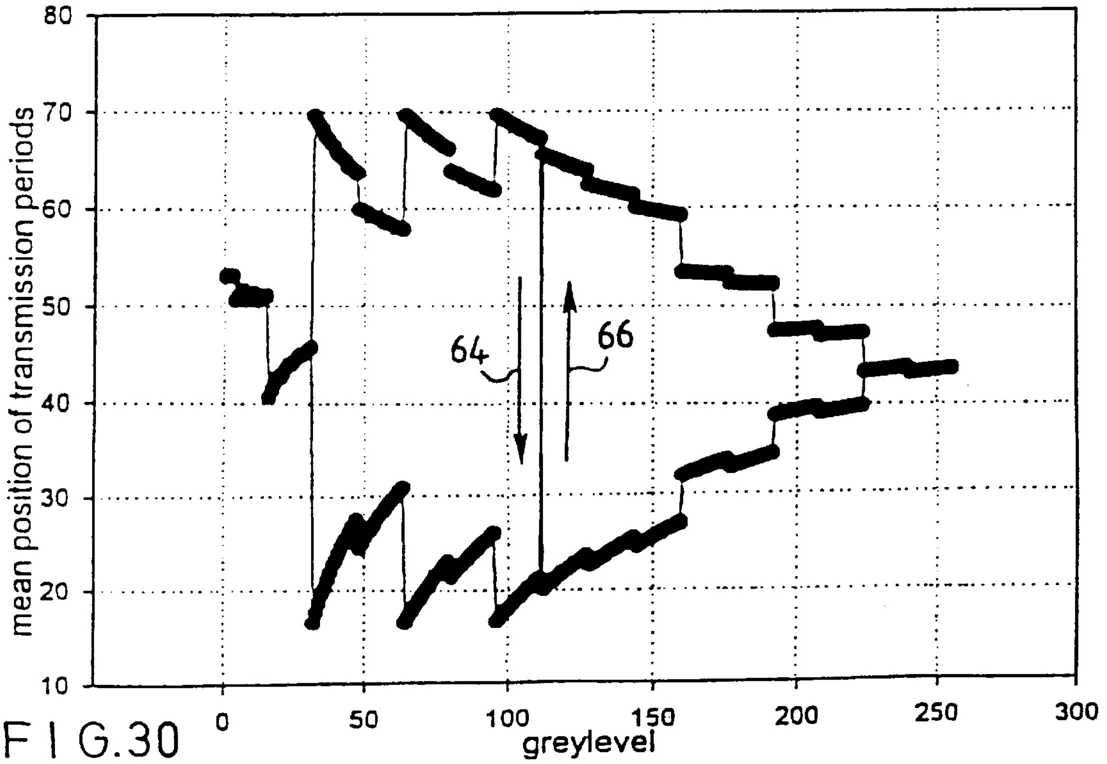

In order to reduce the size of such a transient more lookup tables can be used for controlling neighboring pixels with the position of the uncompensated large mean jump being different in these further tables. FIGS. 29 and 30 show the transient response and mean paths followed for a similar addressing arrangement in which the changes in the mean paths denoted by the arrows 64 and 66 occur at the transition between the grey level 111 and 112. This results in a single large transient occurring at a different transition to that shown in FIG. 27. In a further, non-illustrated arrangement a single large transient is obtained at the transition between the grey levels 143 and 144. Thus, by combining all three such addressing arrangements in addressing of six neighboring pixels, a response corresponding to the average of the responses of the six pixels using six different mean paths will result in three large transients having amplitudes reduced by a third with respect to the large transients shown in FIGS. 27 and 29, thus making these transients only slightly larger than the other small transients. An optimum response can therefore be obtained by a combination of such addressing arrangements for addressing a number of neighboring pixels in order to obtain averaging of the response obtained with the individual addressing arrangements.

Figure 31:
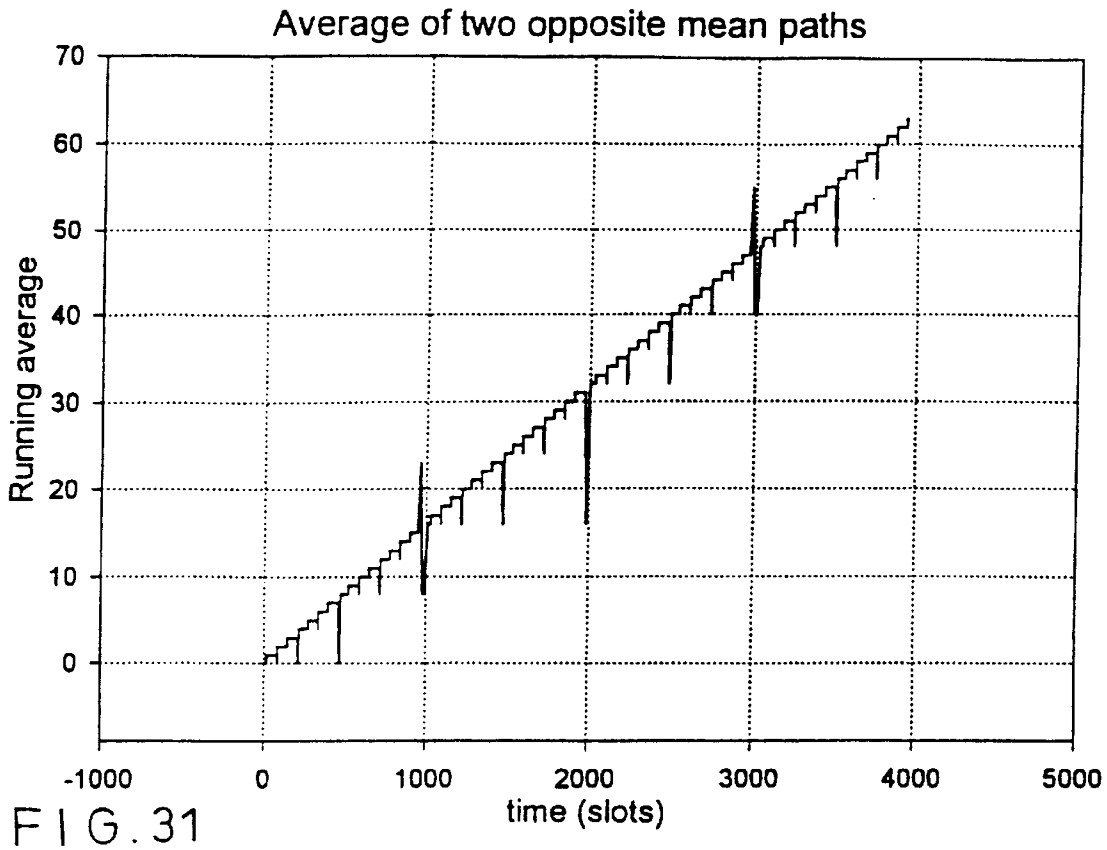
FIGS. 31 and 32 are graphs, similar to that of FIG. 7, for a split MSB TD 16:1:2:4:8:16:16 only addressing arrangement.
Figure 32:
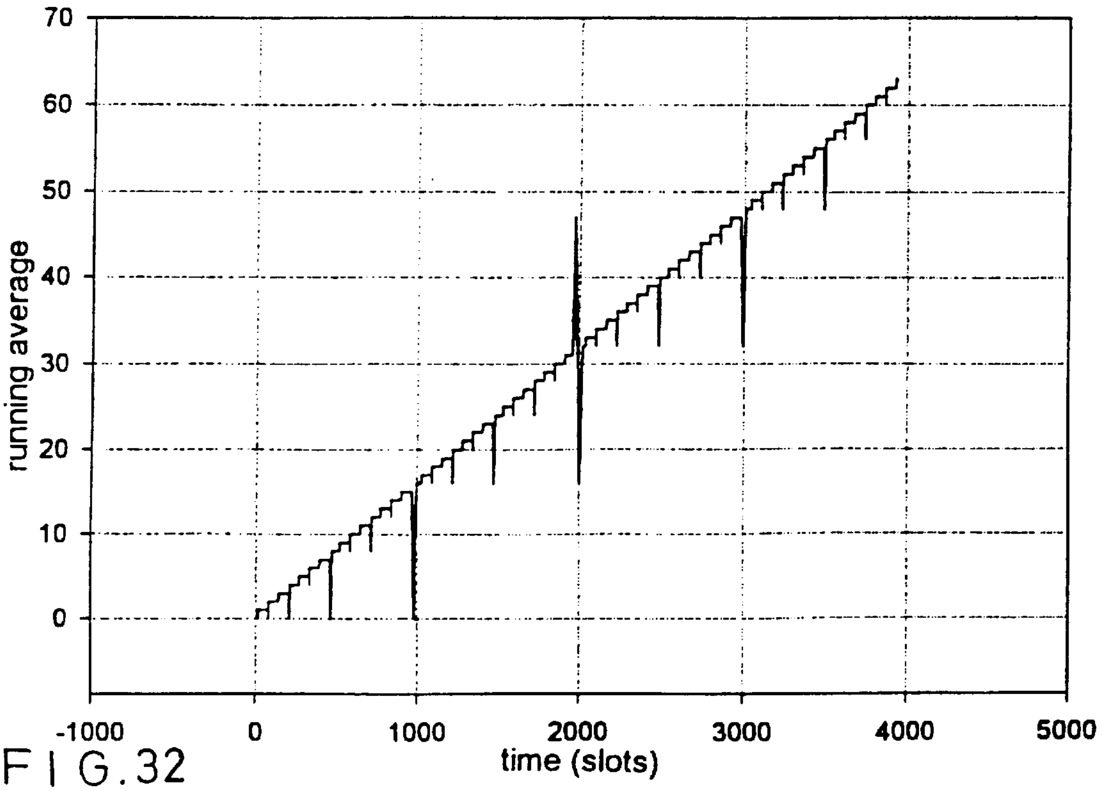

In accordance with a further embodiment of the invention a TD only addressing arrangement utilizes a split MSB TD 16:1:2:4:8:16:16 arrangement (in place of TD 1:2:4:8:16:32) in which neighboring pixels follow opposite mean paths. The transient response in such an addressing arrangement is shown in FIG. 31 during scanning through all 64 grey levels 0–63 sequentially. For comparison, FIG. 32 shows the transient response for a conventional split MSB TD 16:1:2:4:8:16:16 in which all pixels follow the same mean path. As in the previous embodiments the amplitude of the transients is decreased by the fact that neighboring pixels follow opposite mean paths.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, applications of the present invention is not limited to FLCDs, and the present invention can be also applied to plasma displays or digital micromirror devices.

What is claimed is:

1. A light modulating device comprising:

an addressable matrix of modulating elements; and addressing means for selectively addressing each element within a series of addressing frames in order to vary the transmission level of the element relative to the transmission levels of the other elements, the addressing means including temporal dither means for addressing each element within each frame with different combinations of temporal dither signals applied to separately addressable temporal bits within the frame to produce different overall transmission levels, wherein the temporal dither means is arranged to address a first modulating element with a first combination of temporal dither signals to produce a first transmission level and to address a second modulating element with a second combination of temporal dither signals, which differs from the first combination of temporal dither signals, to produce the same first transmission level such that, during a transition between the first transmission level and a second transmission level, a transient in one direction in the transmission level of the first modulating element is at least partially compensated for by a transient in the opposite direction in the transmission level of the second modulating element.

2. The light modulating device according to claim 1, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

3. The light modulating device according to claim 2, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

4. The light modulating device according to claim 3, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

5. The light modulating device according to claim 4, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

6. The light modulating device according to claim 1, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

7. The light modulating device according to claim 6, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

8. The light modulating device according to claim 7, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

9. The light modulating device according to claim 1, wherein the addressing means includes spatial dither means for addressing separately addressable spatial bits of each element with different combinations of spatial dither signals.

10. The light modulating device according to claim 9, wherein the spatial bits are of different sizes.

11. The light modulating device according to claim 1, wherein the temporal bits include two bits of the same significance, and at least one further bit of lesser significance.

12. The light modulating device according to claim 1, which is a ferroelectric liquid crystal device.

13. The light modulating device according to claim 1, which is a ferroelectric liquid crystal display.

14. The light modulating device according to claim 1, which is a plasma display.

15. The light modulating device according to claim 1, which is a digital micromirror device.

16. The light modulating device according to claim 1, wherein the temporal dither means is arranged to address the first modulating element with a third combination of temporal dither signals, which differs from the first and second combinations of temporal dither signals, to produce the second transmission level and to address the second modulating element with a fourth combination of temporal dither signals, which differs from the first, second and third combinations of temporal dither signals to produce the same second transmission level.

17. The light modulating device according to claim 16, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

18. The light modulating device according to claim 17, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

19. The light modulating device according to claim 18, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

20. The light modulating device according to claim 19, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

21. The light modulating device according to claim 16, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

22. The light modulating device according to claim 21, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

23. The light modulating device according to claim 22, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

24. The light modulating device according to claim 16, wherein the addressing means includes spatial dither means for addressing separately addressable spatial bits of each element with different combinations of spatial dither signals.

25. The light modulating device according to claim 24, wherein the spatial bits are of different sizes.

26. The light modulating device according to claim 16, wherein the temporal bits include two bits of the same significance, and at least one further bit of lesser significance.

27. The light modulating device according to claim 16, which is a ferroelectric liquid crystal device.

28. The light modulating device according to claim 16, which is a ferroelectric liquid crystal display.

29. The light modulating device according to claim 16, which is a plasma display.

30. The light modulating device according to claim 16, which is a digital micromirror device.

31. The light modulating device according to claim 1, wherein the temporal dither means comprises first lookup table means for supplying combinations of temporal dither signals to control the transmission level of the first modulating element and second lookup table means for supplying combinations of temporal dither signals to control the transmission level of the second modulating element.

32. The light modulating device according to claim 31, wherein, for some transmission levels, different lookup table means are used to control the transmission levels of the first and second modulating elements whereas, for other transmission levels, the same lookup table means is used to control the transmission levels of the first and second modulating elements.

33. The light modulating device according to claim 32, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

34. The light modulating device according to claim 33, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

35. The light modulating device according to claim 34, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

36. The light modulating device according to claim 35, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

37. The light modulating device according to claim 31, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

38. The light modulating device according to claim 37, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

39. The light modulating device according to claim 38, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

40. The light modulating device according to claim 39, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

41. The light modulating device according to claim 37, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

42. The light modulating device according to claim 41, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

43. The light modulating device according to claim 31, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

44. The light modulating device according to claim 31, wherein the addressing means includes spatial dither means for addressing separately addressable spatial bits of each element with different combinations of spatial dither signals.

45. The light modulating device according to claim 44, wherein the spatial bits are of different sizes.

46. The light modulating device according to claim 31, wherein the first lookup table means is arranged to control the transmission levels of first modulating elements disposed along first rows or columns and the second lookup table means is arranged to control the transmission levels of second modulating elements disposed along second rows or columns alternating with the first rows or columns.

47. The light modulating device according to claim 46, wherein, for some transmission levels, different lookup table means are used to control the transmission levels of the first and second modulating elements whereas, for other transmission levels, the same lookup table means is used to control the transmission levels of the first and second modulating elements.

48. The light modulating device according to claim 47, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

49. The light modulating device according to claim 48, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

50. The light modulating device according to claim 49, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

51. The light modulating device according to claim 50, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

52. The light modulating device according to claim 46, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

53. The light modulating device according to claim 52, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

54. The light modulating device according to claim 53, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

55. The light modulating device according to claim 54, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

56. The light modulating device according to claim 46, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

57. The light modulating device according to claim 46, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

58. The light modulating device according to claim 46, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

59. The light modulating device according to claim 31, wherein the first lookup table means is arranged to control the transmission levels of first modulating elements and the second lookup table means is arranged to control the transmission levels of second modulating elements which alternate with the first modulating elements along two mutually transverse directions.

60. The light modulating device according to claim 59, wherein, for some transmission levels, different lookup table means are used to control the transmission levels of the first and second modulating elements whereas, for other transmission levels, the same lookup table means is used to control the transmission levels of the first and second modulating elements.

61. The light modulating device according to claim 60, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

62. The light modulating device according to claim 61, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

63. The light modulating device according to claim 62, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

64. The light modulating device according to claim 63, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

65. The light modulating device according to claim 59, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

66. The light modulating device according to claim 65, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

67. The light modulating device according to claim 66, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

68. The light modulating device according to claim 67, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

69. The light modulating device according to claim 31, wherein the first lookup table means is arranged to control the transmission levels of the first modulating elements and the second lookup table means is arranged to control the transmission levels of the second modulating elements which are disposed in a less regular fashion among the first modulating elements.

70. The light modulating device according to claim 69, wherein, for some transmission levels, different lookup table means are used to control the transmission levels of the first and second modulating elements whereas, for other transmission levels, the same lookup table means is used to control the transmission levels of the first and second modulating elements.

71. The light modulating device according to claim 70, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

72. The light modulating device according to claim 71, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

73. The light modulating device according to claim 72, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

74. The light modulating device according to claim 73, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

75. The light modulating device according to claim 69, wherein the temporal dither means is arranged to address the first modulating element with the first combination of temporal dither signals with a phase delay relative to the addressing of the second modulating element with the second combination of temporal dither signals such that the transient in the transmission level of the first modulating element is better compensated for by the transient in the transmission level of the second modulating element during the transition between the first and second transmission levels.

76. The light modulating device according to claim 75, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

77. The light modulating device according to claim 76, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

78. The light modulating device according to claim 77, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

79. The light modulating device according to claim 69, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

80. The light modulating device according to claim 69, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

81. The light modulating device according to claim 69, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

82. The light modulating device according to claim 59, wherein the temporal dither means is arranged to control the transmission levels of the first and second modulating element such that, in the case of those transitions between adjacent transmission levels which give rise to large changes in the mean position of the transmission periods of the temporal bits, such large changes are in one direction for all transitions of the first modulating element and are in the opposite direction for all transitions of the second modulating element.

83. The light modulating device according to claim 56, wherein the temporal dither means is arranged to control the transmission levels of the first and second modulating elements such that the path followed by the mean position of the transmission periods of the temporal bits during transitions between transmission levels of the first modulating element and the path followed by the mean position of the transmission periods of the temporal bits during transitions between transmission levels of the second modulating element are interchanged at a predetermined transition point during a series of such transitions occurring sequentially to change the transmission levels of the first and second modulating elements between two limiting values.

84. The light modulating device according to claim 59, wherein the temporal dither means is arranged to control the transmission levels of further modulating elements such that the paths followed by the mean positions during transitions of the further modulating elements are interchanged at transition points which are different to the transition points of the other modulating elements so as to decrease the amplitude of the overall transient resulting from the interchanging of such paths for both the first and second modulating elements and the further modulating elements.

* * * * *